(12) United States Patent
Yasugi et al.

(10) Patent No.: US 9,467,616 B2
(45) Date of Patent: Oct. 11, 2016

(54) DISTANCE MEASUREMENT APPARATUS AND DISTANCE MEASUREMENT METHOD

(71) Applicant: Panasonic Intellectual Property Management Co., Ltd., Osaka (JP)

(72) Inventors: Shunsuke Yasugi, Osaka (JP); Kozo Ezawa, Osaka (JP); Takashi Kawamura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 14/407,569

(22) PCT Filed: Feb. 26, 2014

(86) PCT No.: PCT/JP2014/001025
§ 371 (c)(1),
(2) Date: Dec. 12, 2014

(87) PCT Pub. No.: WO2014/171051
PCT Pub. Date: Oct. 23, 2014

(65) Prior Publication Data
US 2015/0146033 A1    May 28, 2015

(30) Foreign Application Priority Data
Apr. 15, 2013 (JP) ................. 2013-084607

(51) Int. Cl.
*G03B 13/00* (2006.01)
*H04N 5/232* (2006.01)
(Continued)

(52) U.S. Cl.
CPC ............ *H04N 5/23212* (2013.01); *G01C 3/32* (2013.01); *G02B 7/28* (2013.01); *G02B 7/36* (2013.01);
(Continued)

(58) Field of Classification Search
CPC . H04N 5/23212; H04N 5/378; G06T 7/0069

USPC .............................................. 348/345, 222.1
See application file for complete search history.

(56) References Cited

U.S. PATENT DOCUMENTS 7,945,151 B2   5/2011   Hirai
8,773,570 B2   7/2014   Kimura et al.
(Continued)

FOREIGN PATENT DOCUMENTS

EP   1 256 831   11/2002
JP   2963990     10/1999
(Continued)

OTHER PUBLICATIONS

International Search Report issued May 13, 2014 in corresponding International Application No. PCT/JP2014/001025.
(Continued)

*Primary Examiner* — Antoinette Spinks
(74) *Attorney, Agent, or Firm* — Wenderoth, Lind & Ponack, L.L.P.

(57) ABSTRACT

A distance measurement apparatus includes: an imaging element that images an object by performing exposure and readout of electric charges sequentially for each row or column; an optical system that has a controllable in-focus position; an imaging control unit that moves the in-focus position at constant speed, and causes the imaging element to image the object sequentially while the in-focus position is being moved, to obtain blurred images; a distance measurement unit that measures a distance from a reference position in the optical system to the object using the blurred images and a point spread function dependent on object distance; and a correction unit that performs a correction process on the distance for each row or column according to a movement range of the in-focus position in which the in-focus position is moved during the exposure for each row or column when the blurred images are obtained.

14 Claims, 10 Drawing Sheets

(51) Int. Cl.
  G02B 7/28    (2006.01)
  G02B 7/36    (2006.01)
  H04N 5/353   (2011.01)
  G06T 7/00    (2006.01)
  H04N 5/378   (2011.01)
  G01C 3/32    (2006.01)
  G03B 13/36   (2006.01)

(52) U.S. Cl.
  CPC ............ *G06T 7/0069* (2013.01); *H04N 5/232* (2013.01); *H04N 5/353* (2013.01); *H04N 5/378* (2013.01); *G03B 13/36* (2013.01)

(56) References Cited

U.S. PATENT DOCUMENTS

| | | | | |
|---|---|---|---|---|
| 2006/0291844 | A1* | 12/2006 | Kakkori | G03B 7/093 396/89 |
| 2008/0292298 | A1 | 11/2008 | Hirai | |
| 2012/0154668 | A1 | 6/2012 | Kimura et al. | |
| 2012/0236124 | A1* | 9/2012 | Aoki | G01C 3/085 348/47 |
| 2013/0113984 | A1* | 5/2013 | Shimamoto | G03B 13/32 348/345 |
| 2013/0121537 | A1 | 5/2013 | Monobe et al. | |
| 2014/0146140 | A1 | 5/2014 | Shimamoto et al. | |
| 2014/0184883 | A1 | 7/2014 | Shimamoto | |
| 2014/0232887 | A1* | 8/2014 | Berberian | H04N 5/2329 348/208.6 |
| 2014/0253784 | A1 | 9/2014 | Kimura et al. | |
| 2016/0182793 | A1* | 6/2016 | Berberian | H04N 5/23267 348/208.6 |

FOREIGN PATENT DOCUMENTS

| | | |
|---|---|---|
| JP | 2007-10908 | 1/2007 |
| JP | 2012-5063 | 1/2012 |
| JP | 4862312 | 1/2012 |
| WO | 2011/158508 | 12/2011 |
| WO | 2012/140899 | 10/2012 |
| WO | 2012/164881 | 12/2012 |
| WO | 2013/054527 | 4/2013 |
| WO | 2013/171954 | 11/2013 |

OTHER PUBLICATIONS

Changyin Zhou et al., "Coded Aperture Pairs for Depth from Defocus", IEEE International Conference on Computer Vision (ICCV), Oct. 2009.

Shuhei Matsui et al., "Focus Sweep Imaging for Depth From Defocus", Kenkyu Hokoku ComputerVision and Image Media (CVIM), 2010-CVIM-174, Information Processing Society of Japan, Nov. 11, 2010, pp. 1 to 8, Permalink: http://id.nii.ac.jp/1001/00071046/ (with English abstract).

* cited by examiner

DISTANCE MEASUREMENT APPARATUS AND DISTANCE MEASUREMENT METHOD

TECHNICAL FIELD

The present invention relates to distance measurement apparatuses and distance measurement methods.

BACKGROUND ART

Depth from Defocus (DFD) indicates a method of measuring a distance, by using two or more images with different focus points, based on information on blurs. A captured blurred image is an image formed by convolving an all-in-focus image which represents a state of no lens blur with a point spread function which is a function for an object distance. Since the point spread function is a function involving the object distance as a variable, detecting a blur from the blurred images by the DFD can lead to the determination of the object distance.

Here, the all-in-focus image and the object distance are unknown quantities. For one blurred image, one equation involving the blurred image, the all-in-focus image, and the object distance holds. Capturing a new blurred image with a different in-focus position offers a new equation, and the obtained equations are solved to determine the object distance. How to obtain the equations, how to solve the equations, or the like is disclosed by Patent Literature (PTL) 1, Non Patent Literature (NPL) 1, and so on.

CITATION LIST

Patent Literature

[PTL 1] Japanese Patent No. 2963990
[PTL 2] International Publication WO2011/158508
[PTL 3] International Publication WO2012/140899
[PTL 4] Japanese Patent No. 4862312
[PTL 5] Japanese Unexamined Patent Application Publication No. 2007-10908

Non Patent Literature

[NPL 1] C. Zhou, S. Lin and S. Nayar. "Coded Aperture Pairs for Depth from Defocus" In International Conference on Computer Vision, 2009

SUMMARY OF INVENTION

Technical Problem

In the conventional DFD, capturing two or more images requires more time than capturing normal images. In addition, the in-focus position needs to change two or more times in reciprocation in a short time; this places a load on an actuator or the like device that controls the in-focus position, and also causes a further problem such as increased power consumption.

Thus, the present invention provides a distance measurement apparatus that determines a distance to an object in a short time by using a simple control on the in-focus position.

Solution to Problem

A distance measurement apparatus according to an aspect of the present invention includes: an imaging element that includes photoelectric conversion elements arranged in rows and columns, and images an object by performing exposure and readout of electric charges sequentially for each of the rows or each of the columns; an optical system that is for forming an image of the object on the imaging element and has an in-focus position that is controllable; an imaging control unit configured to (i) control the optical system to cause the in-focus position to move at constant speed and (ii) cause the imaging element to image the object sequentially while the in-focus position is being moved at the constant speed, to obtain a plurality of blurred images; a distance measurement unit configured to measure a distance from a reference position in the optical system to the object using the plurality of blurred images and a point spread function dependent on object distance; and a correction unit configured to, before or after the measurement of the distance by the distance measurement unit, perform a correction process on the distance for each of the rows or each of the columns according to a movement range of the in-focus position in which the in-focus position is moved during the exposure for the each of the rows or the each of the columns when the plurality of blurred images are obtained.

These general and specific aspects may be implemented using a system, a method, an integrated circuit, a computer program, or a computer-readable recording medium, such as a compact disc read only memory (CD-ROM), or any combination of systems, methods, integrated circuits, computer programs, or recording media.

Advantageous Effects of Invention

The distance measurement apparatus according to an aspect of the present invention is capable of determining a distance to an object in a short time by using a simple control on an in-focus position.

Figure 1:
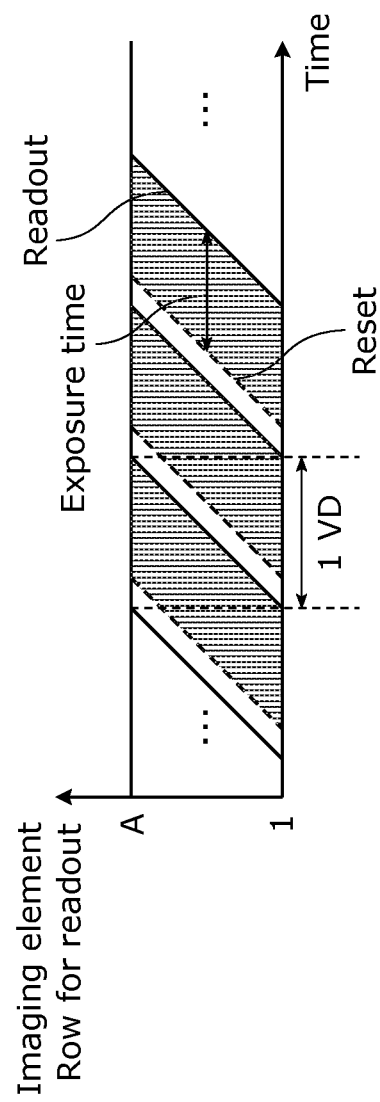
FIG. 1 explains an image capture operation of an imaging element including a rolling shutter.

DESCRIPTION OF EMBODIMENTS (Underlying Knowledge Forming Basis of the Present Invention)

The inventor of the present invention found that the DFD stated in the [Background Art] section has the following problems.

Various methods have been proposed to measure a depth of a certain three-dimensional scene, that is, a distance to each object, in a contact-free manner. These methods are roughly classified as an active approach and a passive approach. In the active approach, infrared rays, ultrasound waves, or lasers are emitted, and a distance is calculated based on a length of time taken by reflected waves to return or an angle of reflected waves. In the passive approach, a distance is calculated based on an image of an object. Particularly, in cameras, the passive approach, which requires no device for emitting infrared rays or the like, has been widely used.

One of many approaches proposed as the passive approach is an approach called Depth from Defocus, in which a distance is measured based on information on blurs, the size, shape, etc., of which depend on the object distance. This approach has features such as not requiring a plurality of cameras and being able to measure a distance based on a small number of images.

The following briefly describes the principle of the DFD.

Depth from Defocus (DFD) indicates a method of measuring a distance, by using two or more images with different in-focus positions, based on information on blurs. A captured blurred image is an image formed by convolving an all-in-focus image which represents a state of no lens blur with a point spread function which is a function for an object distance. Since the point spread function is a function involving the object distance as a variable, detecting a blur from the blurred images by the DFD can lead to the determination of the object distance.

Here, the all-in-focus image and the object distance are unknown quantities. For one blurred image, one equation involving the blurred image, the all-in-focus image, and the object distance holds. Capturing a new blurred image with a different in-focus position offers a new equation, and the obtained equations are solved to determine the object distance. How to obtain the equations, how to solve the equations, or the like is disclosed by Patent Literature (PTL) 1, Non Patent Literature (NPL) 1, and so on.

Furthermore, PTL 2 and PTL 3 disclose a method of calculating a distance to an object by using two or more images captured with in-focus positions moving in different ranges for the respective images during exposure (hereinafter referred to as Sweep DFD).

The in-focus position is moved during exposure so that the point spread functions and images corresponding to two or more consecutive in-focus positions are accumulated and averaged. In the Sweep DFD, a distance is calculated using the accumulated and averaged point spread functions and images.

Meanwhile, among the existing imaging elements that capture an image, namely, a complementary metal-oxide semiconductor (CMOS) imaging element and a charge coupled devices (CCD) imaging element, the CMOS imaging element is superior to the CCD imaging element in that it is capable of high-speed shooting and consumes less power, for example.

At present, many CMOS imaging elements adopt an electronic shutter system called a rolling shutter. In the rolling shutter system, resetting of electric charges, exposure, and readout of electric charges are performed sequentially on a row or column basis in a pixel array in which pixels are arranged two-dimensionally (in rows and columns). It should be noted that although the implementation in which the resetting of electric charges and so on are performed on a row basis is described hereinbelow, the same applies to the implementation on a column basis.

FIG. 1 explains an image capture operation of an imaging element including a rolling shutter. FIG. 1 illustrates a timing example of resetting of electric charges, exposure, and readout of electric charges in a rolling shutter that has different exposure time for each row.

In FIG. 1, the horizontal axis represents time and the vertical axis represents a row number of the case where the imaging element has the "A" number of pixel rows. In this figure, a broken line represents timing of resetting of electric charges, and a solid line represents timing of readout of electric charges. This imaging element obtains signals of an entire image by repeating an operation including resetting of electric charges, exposure, and readout of electric charges sequentially on a row basis from the top row of the imaging element. Here, time taken for readout in one image throughout rows from the first row to the A-th row of the imaging element is defined as "1VD."

As described above, the DFD requires two or more images captured with respective focus positions within different ranges, therefore requiring the in-focus position to be moved during the period for which the two or more images are captured. This means that it is necessary to provide an additional period for moving the in-focus position between the exposure time for the n-th image and the exposure time for the (n+1)-th image.

Furthermore, it is not that the rolling shutter can start the exposure for the first row in the (n+1)-th image immediately after completing the exposure for the first row in the n-th image. After completing the exposure for the last row in the n-th image, the rolling shutter moves the in-focus position before starting the exposure for the first row in the (n+1)-th image, therefore taking long time to capture the images.

Figure 2:
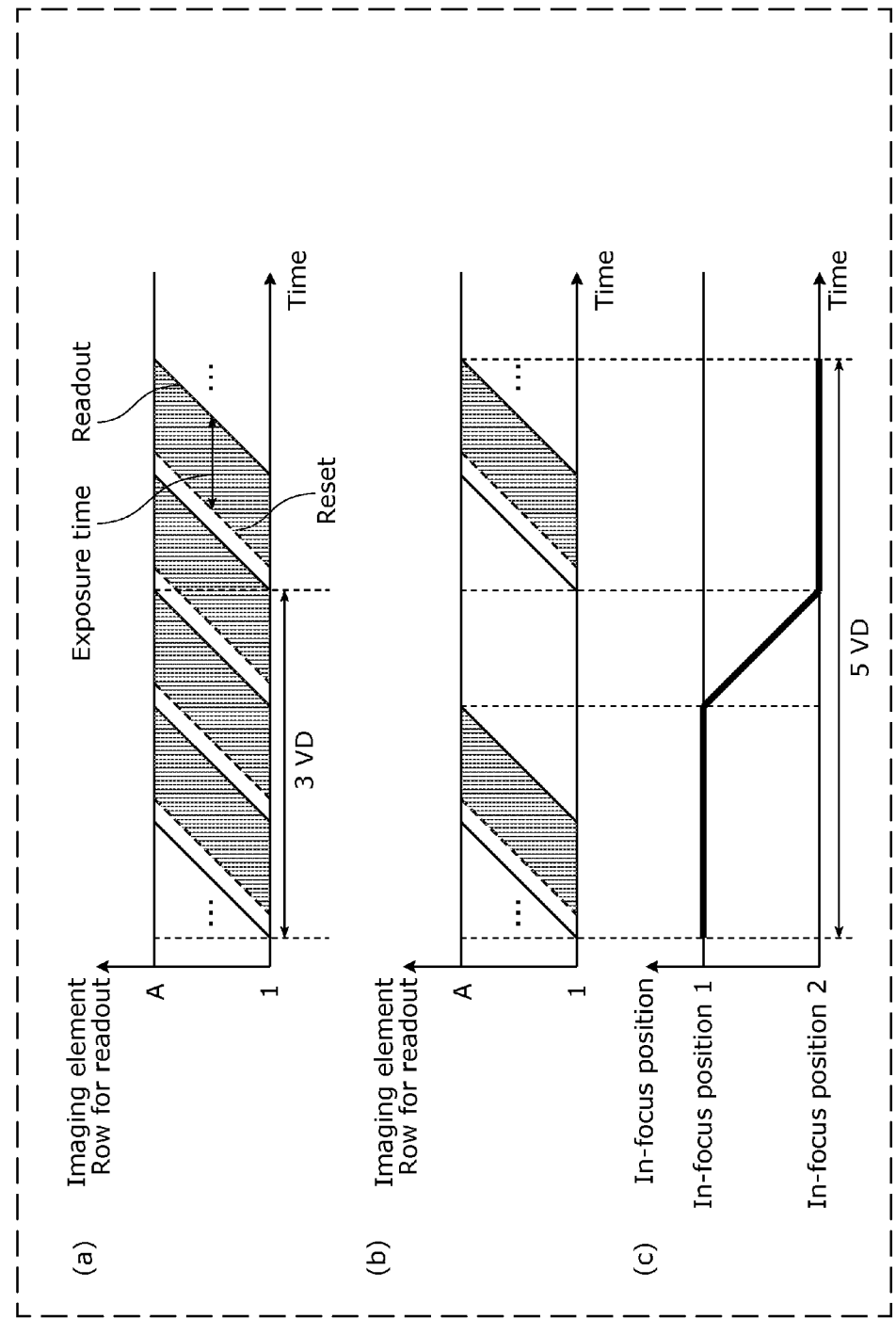
FIG. 2 explains an image capture operation and an in-focus position applied when an imaging element including a rolling shutter captures an image.

FIG. 2 explains an image capture operation and an in-focus position in the related art in which an imaging element including the rolling shutter captures an image.

Specifically, in FIG. 2, (a) illustrates an image capture operation of an imaging element including the rolling shutter which is performed in the case where the imaging element captures two images. In FIG. 2, (b) illustrates an image capture operation of an imaging element including the rolling shutter in the related art which is performed in the case where the imaging element captures two images for use in the DFD. In FIG. 2, (c) illustrates how an in-focus position in the related art moves in the above case.

In FIG. 2, (a) indicates timing of each of resetting of electric charges, exposure, and readout of electric charges which are performed in normal image capture by the imaging element including the rolling shutter. Furthermore, in FIG. 2, (b) and (c) indicate timing of each of the above operations and an in-focus position which the imaging element including the rolling shutter uses to capture images for use in the DFD. Here, the in-focus position indicated in FIG. 2 is a position on an imaging plane side.

The imaging element is, in normal image capture, capable of capturing two images in 3VD as illustrated in (a) of FIG. 2. On the other hand, the imaging element requires, in the case of the DFD, at least 5VD to capture two images as illustrated in (b) and (c) of FIG. 2. In the case of the DFD, the imaging element firstly completes the exposure for the first row to the A-th row in the first image while the in-focus position is at an in-focus position 1. The imaging element then moves the in-focus position to an in-focus position 2 and starts capturing the second image. Therefore, for capturing the above two images, the imaging element requires 2VD to capture each of the first image and the second image and further requires at least 1VD to move the in-focus position. In sum, the imaging element requires 5VD in total to capture the above two images.

If the imaging element including the rolling shutter is used in the case of the Sweep DFD, the in-focus position is moved during exposure, meaning that the range of the in-focus position is different for each row in an image. Accordingly, the point spread function, the accumulation of images, and an averaged range of the in-focus positions are different for each row in the image, causing a failure to obtain an accurate distance to an object.

In PTL 3, movement of the in-focus position during exposure is innovated to capture an image in a manner that the accumulated and averaged point spread functions are the same for each row in an image.

Thus, when the imaging element including the rolling shutter needs to move the in-focus position in capturing images, the in-focus position and the range thereof are different for each row; therefore, there are various problems in the DFD.

PTL 4 and PTL 5 disclose methods in which, when it is necessary to change the in-focus position between when capturing the n-th image and when capturing the (n+1) image, the imaging element including the rolling shutter efficiently captures images at high speed and target information is calculated.

Specifically, PTL 4 and PTL 5 disclose techniques related to autofocus (AF). These techniques are based on the AF system in which, in an AF-targeted area in an image, evaluation values each indicating a degree of in-focus are calculated for two or more respective images, then a peak position of the evaluation values is searched for, and an in-focus position with which light is focused on a target object is calculated using the peak position of the evaluation values. In these techniques, the in-focus position is moved during exposure, the evaluation values are calculated, and furthermore, a difference of the in-focus position of the target object is corrected later. Here, the difference of the in-focus position of the target object indicates a difference in in-focus position between rows that is caused by the rolling shutter due to the in-focus range obtained during the exposure being different for each row.

The method in PTL 3 requires more time to capture the two or more images than in normal image capture in (a) of FIG. 2. In addition, the in-focus position needs to change two or more times in reciprocation in a short time; this places a load on an actuator or the like device that controls the in-focus position, and also causes a further problem such as increased power consumption.

In PTL 4 and PTL 5, since the in-focus position is determined based on the peak position in the graph of the evaluation values calculated using at least three images in the AF-targeted area, it will further be necessary to capture more images if no peak appears. In addition, even if a peak appears for a particular object, there is no guarantee that a peak appears for the object at a different distance.

Thus, the present invention provides a distance measurement apparatus that determines a distance to an object in a short time by using a simple control on the in-focus position.

In order to solve such problems, a distance measurement apparatus according to an aspect of the present invention includes: an imaging element that includes photoelectric conversion elements arranged in rows and columns, and images an object by performing exposure and readout of electric charges sequentially for each of the rows or each of the columns; an optical system that is for forming an image of the object on the imaging element and has an in-focus position that is controllable; an imaging control unit configured to (i) control the optical system to cause the in-focus position to move at constant speed and (ii) cause the imaging element to image the object sequentially while the in-focus position is being moved at the constant speed, to obtain a plurality of blurred images; a distance measurement unit configured to measure a distance from a reference position in the optical system to the object using the plurality of blurred images and a point spread function dependent on object distance; and a correction unit configured to, before or after the measurement of the distance by the distance measurement unit, perform a correction process on the distance for each of the rows or each of the columns according to a movement range of the in-focus position in which the in-focus position is moved during the exposure for the each of the rows or the each of the columns when the plurality of blurred images are obtained.

With this, the distance measurement apparatus is capable of determining distances to an object located at various distances by using a small number of images efficiently captured at high speed. Furthermore, the control on the in-focus position is simple so that, when determining a distance, the load on an actuator or the like device that controls the in-focus position can be small, and the power consumption can also be small.

Furthermore, the distance measurement apparatus is capable of measuring an object distance by performing the processes of calculating an object distance by the DFD and correcting the object distance, using a plurality of blurred images captured with the in-focus position moving at constant speed. Since the above calculation process is processing in which movement of the in-focus position is not taken into account, the calculation process alone does not assure accurate measurement of an object distance. Therefore, the result of the above calculation process is corrected in the above correction process, with the result that a measured object distance will be accurate.

According to the related art, a plurality of blurred images obtained have respective in-focus positions that are fixed and different from each other, meaning that the process of obtaining a blurred image and the process of moving the in-focus position need to be repeated to obtain the plurality of blurred images. In contrast, the distance measurement apparatus according to the present invention performs the processes of obtaining a blurred image and moving the in-focus position simultaneously in parallel, thus being capable of completing the processes in a short time. Furthermore, since the speed at which the in-focus position is moved is constant, the amount of processing in the correction process can be small. Thus, the distance measurement apparatus is capable of determining a distance to an object in a short time by using a simple control on the in-focus position.

For example, it may be that the imaging control unit is configured to: obtain, as the plurality of blurred images, at least (n+1) blurred images where n is an integer greater than or equal to 1; when a point in time for starting exposure of the imaging element to obtain a first image which is one of the at least (n+1) blurred images that is obtained first is denoted by TS(1), a point in time for ending the exposure of the imaging element to obtain the first image is denoted by TE(1), a point in time for starting exposure of the imaging element to obtain a second image which is one of the at least (n+1) blurred images that is obtained last is denoted by TS(1+n), and a point in time for ending the exposure of the imaging element to obtain the second image is denoted by TE(1+n), (i) cause the in-focus position to be at a first position at TS(1); (ii) cause the in-focus position to be at a second position at TE(1+n), the second position being different from the first position; and (iii) cause the in-focus position to move at the constant speed in a period from TS(1) to TE(1) and in a period from TS(1+n) to TE(1+n), the distance measurement unit is configured to measure the distance from the reference position to the object for each pixel in at least one of the first image or the second image using the point spread function, the first image, and the second image, and the correction unit is configured to perform the correction process according to a movement range of the in-focus position in which the in-focus position is moved during the exposure for the each of the rows or the each of the columns when the first image and the second image are obtained.

With this, the distance measurement apparatus is capable of obtaining each of the first image and the second image, among a plurality of blurred images, with the in-focus position moving at constant speed. The distance measurement apparatus is then capable of measuring an object distance by using the obtained first and second images.

For example, the imaging control unit may be configured to cause the in-focus position to move, in the period from TS(1+n) to TE(1+n), at a speed equal to a speed at which the in-focus position moves in the period from TS(1) to TE(1).

With this, in the distance measurement apparatus, the speed at which the in-focus position is moved to obtain the first image and the speed at which the in-focus position is moved to obtain the second image are set to the same speed, with the result that the correction process can be simplified.

For example, it may be that the distance measurement apparatus further includes an imaging condition determination unit configured to, before the obtainment of the plurality of blurred images by the imaging control unit, determine whether or not a condition that the point in time for starting the exposure of the imaging element to obtain the second image is earlier than the point in time for ending the exposure of the imaging element to obtain the first image is satisfied, and upon determining that the condition is satisfied, the imaging condition determination unit is configured to (i) cause the imaging control unit to perform a process to obtain the plurality of blurred images, (ii) cause the distance measurement unit to perform a process to measure the distance, and (iii) cause the correction unit to perform the correction process.

With this, the distance measurement apparatus performs a series of processes from obtainment of a plurality of blurred images to measurement and correction of a distance when the exposure period for obtaining the first image and the exposure period for obtaining the second image overlap (that is, when there is no interval between the periods for obtaining the respective images). In the case where the above two exposure periods overlap, it is not possible to start obtaining the second image after completing the obtainment of the first image as in the related art. Therefore, when it is determined before the first image and the second images are obtained that there is no interval between the periods for obtaining the respective images, obtaining the images while moving the in-focus position at constant speed will allow the object distance to be measured using the both images.

For example, it may be that the imaging control unit is configured to obtain, as the plurality of blurred images, at least (n+1) blurred images where n is an integer greater than or equal to 1, and when a point in time for starting exposure of the imaging element to obtain a (1+x)-th image which is one of the plurality of blurred images is denoted by TS(1+x), a point in time for ending the exposure of the imaging element to obtain the (1+x)-th image is denoted by TE(1+x), a point in time for starting exposure of the imaging element to obtain a (1+x+1)-th image which is one of the plurality of blurred images is denoted by TS(1+x+1), and a point in time for ending the exposure of the imaging element to obtain the (1+x+1)-th image is denoted by TE(1+x+1) where $(n-1) \geq x \geq 0$, the distance measurement apparatus further comprises a sequence determination unit configured to determine a sequence of points in time TE(1+x) and TS(1+x+1), and the imaging control unit is configured to cause the in-focus position to move at the constant speed from a third position to a fourth position in a period from TS(1+x) to TE(1+x+1) when the sequence determination unit determines that TE(1+x)>TS(1+x+1) holds, the fourth position being different from the third position.

With this, to be specific, the distance measurement apparatus determines a case where the exposure period for obtaining the first image and the exposure period for obtaining the second image overlap, and in that case, obtains the images while moving the in-focus position at constant speed, thereby being capable of measuring the object distance using the both images.

For example, when the sequence determination unit determines that TE(1+x)<TS(1+x+1) holds, the imaging control unit may be configured to: (i) cause the in-focus position to stop at the third position in a period from TS(1+x) to TE(1+x); (ii) cause the in-focus position to move from the third position to the fourth position in a period from TE(1+x) to TS(1+x+1); and (iii) cause the in-focus position to stop at the fourth position in a period from TS(1+x+1) to TE(1+x+1).

With this, to be specific, the distance measurement apparatus executes the same or the like distance measurement as in the related art in the case where the exposure period for obtaining the first image and the exposure period for obtaining the second image do not overlap (that is, in the case where there is an interval between the periods for obtaining the respective images). In this case, since it is not necessary to obtain the images while moving the in-focus position at constant speed, it is possible to measure the object distance by executing the same or like distance measurement as in the related art.

For example, n may be 1.

With this, the distance measurement apparatus is capable of measuring the object distance using two images, i.e., the first image and the second image.

For example, it may be that n is an integer greater than or equal to 2, and the distance measurement unit is configured to measure the distance using three or more blurred images as the plurality of blurred images.

With this, the distance measurement apparatus is capable of measuring the object distance using three or more images.

For example, it may be that the correction unit includes a correction amount calculation unit configured to calculate, for each of the rows or each of the columns in the imaging element, an amount of correction for the distance measured by the distance measurement unit, and the correction amount calculation unit is configured to calculate the amount of correction for each of the rows or each of the columns in the imaging element, to approximate (i) a diameter of the point spread function corresponding to the movement range of the in-focus position in which the in-focus position is moved during the exposure for the each of the rows or the each of the columns in the imaging element and (ii) a diameter of a point spread function corresponding to a range of an in-focus position of light that has traveled a predetermined distance.

With this, the distance measurement apparatus calculates an amount of correction in the correction process based on a degree of approximation of the diameter of the point spread function corresponding to the movement range of the in-focus position and the diameter of the point spread function corresponding to the range of the in-focus position of light that has traveled a predetermined distance.

For example, the correction unit may be configured to, after the measurement of the distance by the distance measurement unit, perform the correction process by adding or subtracting the amount of correction calculated for each of the rows or each of the columns in the imaging element by the correction amount calculation unit, to or from the distance measured.

With this, the distance measurement apparatus is capable of obtaining an accurate object distance by adding, after measuring a distance by the distance measurement unit, an amount of correction to the measured distance, for example.

For example, it may be that the correction unit is configured to, before the measurement of the distance by the distance measurement unit, perform the correction process by changing the point spread function that is to be used by the distance measurement unit to calculate the distance, according to the amount of correction calculated for each of the rows or each of the columns in the imaging element by the correction amount calculation unit, and the distance measurement unit is configured to measure the distance using the point spread function that is obtained after the correction process is performed by the correction unit.

With this, the distance measurement apparatus is capable of obtaining an accurate object distance by adding, before measuring a distance by the distance measurement unit, an amount of correction to a distance that is an individual variable of the point spread function, for example, and then measuring the distance using the corrected point spread function.

For example, it may be that the imaging control unit is configured to cause a part of the imaging element including photoelectric conversion elements arranged in rows and columns to image the object, to obtain a plurality of blurred images that correspond to a part of the object, the part of the imaging element being used as the imaging element, and the part of the object corresponding to the part of the imaging element, and the distance measurement unit is configured to measure the distance for the part of the object.

With this, the distance measurement apparatus is capable of measuring the object distance in the same or like manner as above by using an image obtained from a part of the imaging element.

Furthermore, a distance measurement method according to an aspect of the present invention is a distance measurement method which is used by a distance measurement apparatus including: an imaging element that includes photoelectric conversion elements arranged in rows and columns, and images an object by performing exposure and readout of electric charges sequentially for each of the rows or each of the columns; and an optical system that is for forming an image of the object on the imaging element and has an in-focus position that is controllable, and the distance measurement method includes: (i) controlling the optical system to cause the in-focus position to move at constant speed and (ii) causing the imaging element to image the object sequentially while the in-focus position is being moved at the constant speed, to obtain a plurality of blurred images; measuring a distance from a reference position in the optical system to the object using the plurality of blurred images and a point spread function dependent on object distance; and performing, before or after the measurement of the distance in the measuring, a correction process on the distance for each of the rows or each of the columns according to a movement range of the in-focus position in which the in-focus position is moved during the exposure for the each of the rows or the each of the columns when the plurality of blurred images are obtained.

With this, the same or like effects as with the above distance measurement apparatus are produced.

Furthermore, a program according to an aspect of the present invention is a program for causing a computer to execute the above distance measurement method.

With this, the same or like effects as with the above distance measurement apparatus are produced.

These general and specific aspects may be implemented using a system, a method, an integrated circuit, a computer program, or a computer-readable recording medium, such as a compact disc read only memory (CD-ROM), or any combination of systems, methods, integrated circuits, computer programs, or recording media.

Hereinafter, embodiments are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the present invention. Therefore, among the structural elements in the following embodiments, structural elements not recited in any one of the independent claims indicating the broadest concept are described as arbitrary structural elements.

Embodiment 1

Figure 3:
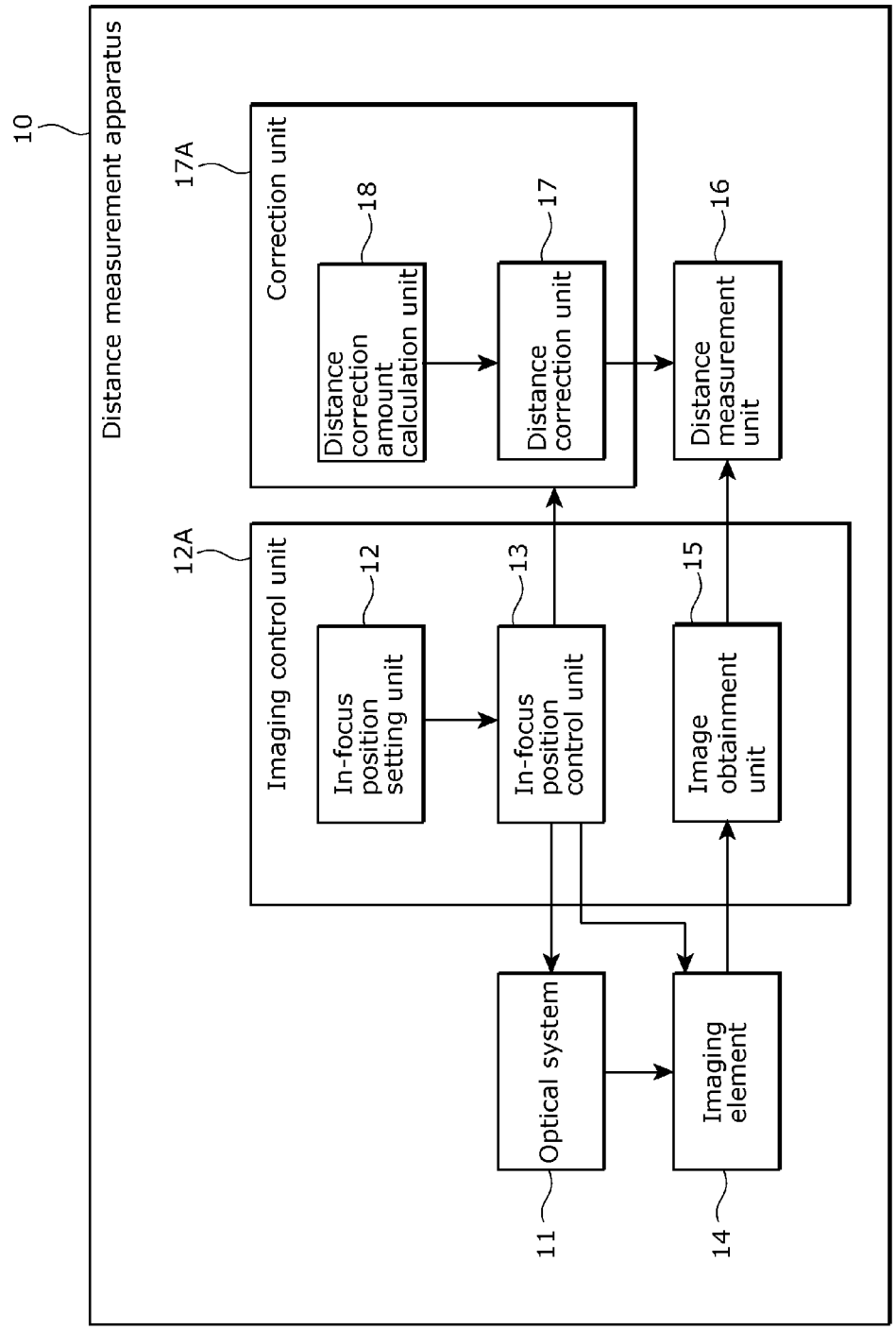
FIG. 3 is a block diagram illustrating a structure of a distance measurement apparatus according to Embodiment 1.

FIG. 3 is a block diagram illustrating a structure of a distance measurement apparatus according to this embodiment.

A distance measurement apparatus 10 includes, as illustrated in FIG. 3, an optical system 11, an in-focus position setting unit 12, an in-focus position control unit 13, an imaging element 14, an image obtainment unit 15, a distance measurement unit 16, a distance correction unit 17, and a distance correction amount calculation unit 18.

The in-focus position setting unit 12, the in-focus position control unit 13, and the image obtainment unit 15 may be collectively referred to as an imaging control unit 12A. The distance correction unit 17 and the distance correction amount calculation unit 18 may be collectively referred to as a correction unit 17A.

The optical system 11 forms an object image on the imaging element 14. Furthermore, the in-focus position of the optical system 11 on the imaging plane side is controllable.

The in-focus position setting unit 12 sets how to move the in-focus position in capturing images for use in the DFD.

The in-focus position control unit 13 controls an actual location of in-focus position using the in-focus position set by the in-focus position setting unit 12.

The in-focus position control unit 13 is formed of an actuator and controls the in-focus position by moving the imaging element 14 along an optical axis thereof.

The imaging element 14 is a CMOS sensor including a rolling shutter. The imaging element 14 includes pixels arranged two-dimensionally (in rows and columns) and each including a photoelectric conversion element, and images an object by performing exposure and readout of electric charges or electric signals sequentially for each of the rows or each of the columns, thereby generating image data. It should be noted that although this embodiment explains, as an example, a case where the imaging element 14 performs the exposure and the readout of electric charges sequentially for each of the rows and is made up of the "A" number of rows, the present invention is not limited to this example.

The image obtainment unit 15 obtains two or more images from the imaging element 14 and holds the obtained images.

The distance measurement unit 16 measures a distance by the DFD using two or more images captured from a single viewpoint and focused at different distances.

The distance correction unit 17 performs a correction process for correcting a difference in distance attributed to the rolling shutter, before the distance measurement unit 16 measures a distance or after the distance measurement unit 16 measures a distance.

The distance correction amount calculation unit 18 calculates, for each row in the imaging element 14, an amount of correction that is to be used in the correction process performed by the distance correction unit 17.

Next, measuring a distance by the DFD by the distance measurement unit 16 is described.

The DFD is a technique for determining a distance to an object based on correlation of blurs included in a small number of images with different in-focus positions. A blurred image i of an object located at a given distance, captured while being in focus at a given distance n, can be represented by Equation 1.

[Math. 1]

$$i = h_s(d) * f \quad \text{(Expression 1)}$$

In Equation 1, i represents the blurred image captured, $h_s$ represents a point spread function (PSF) that corresponds to an object located at a distance d while the image is in focus at a distance s, f represents an all-in-focus image containing no blur, and * represents a convolution integral operator.

In Equation 1, two variables, the all-in-focus image f and the object distance d are unknown. As in Equation 1, the blurred image i and the point spread function h are functions of the in-focus position s and the object distance d. Therefore, as prior information, when in-focus positions s1, s2, ..., and point spread functions $h_{s1}(d)$, $h_{s2}(d)$, ..., which correspond to the object distances d with the respective in-focus positions s1, s2, ..., are held in advance, the number of equations is no less than the number of unknown quantities, allowing the object distance d to be determined.

The following introduces an actual method of calculating the object distance d using two images with different in-focus positions, represented by Equation 2, for example. In Equation 2: i1 represents a captured image with an in-focus position 1 and i2 represents a captured image with an in-focus position 2; $h_1(d)$ represents a point spread function corresponding to the object distances d with the in-focus position 1 and $h_2(d)$ represents a point spread function corresponding to the object distances d with the in-focus position 2; and f represents an all-in-focus image.

[Math. 2]

$$i_1 = h_1(d) * f$$

$$i_2 = h_2(d) * f \quad \text{(Expression 2)}$$

In the DFD, one set of $h_1(d_j)$, which is a point spread function of object distances with the in-focus position 1, and $h_2(d_j)$, which is a point spread function of object distances with the in-focus position 2 different from the in-focus position 1, is held in advance. Here, j=1, 2, ..., J. Images are captured with the in-focus position 1 and the in-focus position 2, and the object distance d is calculated with Equation 3.

[Math. 3]

$$d = \underset{d_j}{\operatorname{argmin}}\left(\left|F^{-1}\left(\hat{F} H_1(d_j) - I_1\right)\right| + \left|F^{-1}\left(\hat{F} H_2\right)(d_j) - I_2\right|\right) \quad \text{(Expression 3)}$$

where j = 1, 2, ..., n $$\hat{F} = \frac{I_1 \overline{H_1(d_j)} + I_1 \overline{H_2(d_j)}}{H_1(d_j)\overline{H_1(d_j)} + H_2(d_j)\overline{H_2(d_j)} + c}$$

In Equation 3: $I_1$, $I_2$, $H_1$, and $H_2$ are respective variables obtained by the Fourier transform of $i_1$, $i_2$, $h_1$, and $h_2$; c is a small value for preventing division by zero; and $F^{-1}$ represents the inverse Fourier transform. Equation 3 represents the object distance d not by analog values but with the use of one $d_j$ among $d_j$ (j=1, 2, ..., 1). When the "J" number of point spread functions h1 and the "J" number of point spread functions h2 are held, it is possible to determine the object distance in up to J stages.

Solving Equation 3 in each of the two-dimensionally arranged pixels in the image enables to create a distance image of an image capture scene. Here, the distance image means an image including, in each pixel, information on a distance to an object.

The distance calculation in the Sweep DFD can be performed likewise. Specifically, it is sufficient that one set of the point spread functions $h_1(d_j)$ and $h_2(d_j)$ (j=1, 2, ..., J) with the in-focus position moving during exposure is held in advance. In the Sweep DFD, since the in-focus position moves during the exposure, the above point spread functions $h_1(d_j)$ and $h_2(d_j)$ can be expressed as a point spread function obtained by consecutively accumulating point spread functions of in-focus positions within movement ranges.

The point spread function held in advance is output in optical simulation using optical simulation software, for example. Furthermore, the point spread function for use in the Sweep DFD that is an accumulated result obtained with the in-focus position moving during the exposure is calculated as follows: the point spread functions corresponding to in-focus positions within the movement range of the in-focus position are outputted in the optical simulation, and the point spread functions outputted are then averaged.

Furthermore, the method of calculating a distance by the DFD is not limited to the method indicated in this embodiment and no particular limitations are placed as long as it is a method of calculating a distance based on information on blurs in images.

The following describes how the DFD is performed using two images with a CMOS sensor including the rolling sensor in this embodiment.

Figure 4:
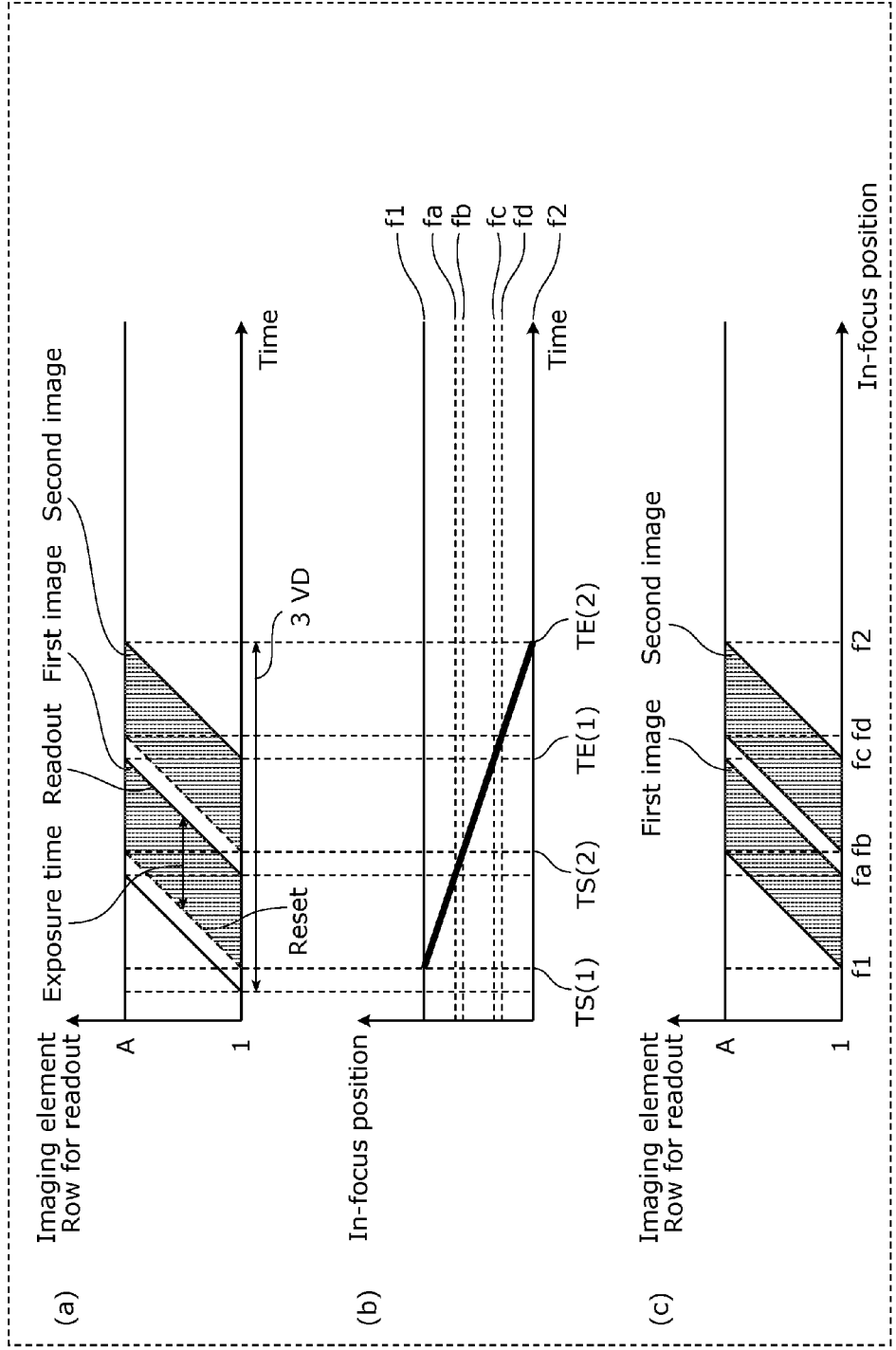
FIG. 4 explains an image capture operation, an in-focus position, and an in-focus range applied when an image is captured using a distance measurement apparatus according to Embodiment 1.

FIG. 4 explains an image capture operation, an in-focus position, and an in-focus range applied when an image is captured using a distance measurement apparatus according to this embodiment.

In FIG. 4, (a) illustrates an image capture operation of an imaging element performed when two images for use in the DFD are captured with the distance measurement apparatus 10 according to this embodiment. In FIG. 4, (b) illustrates how the in-focus position moves in the cases where two images for use in the DFD are captured with the distance measurement apparatus 10 according to this embodiment. In FIG. 4, (c) illustrates an in-focus range obtained during the exposure of two images for use in the DFD in the cases where the two images are captured with the distance measurement apparatus 10 according to this embodiment.

Figure 5:
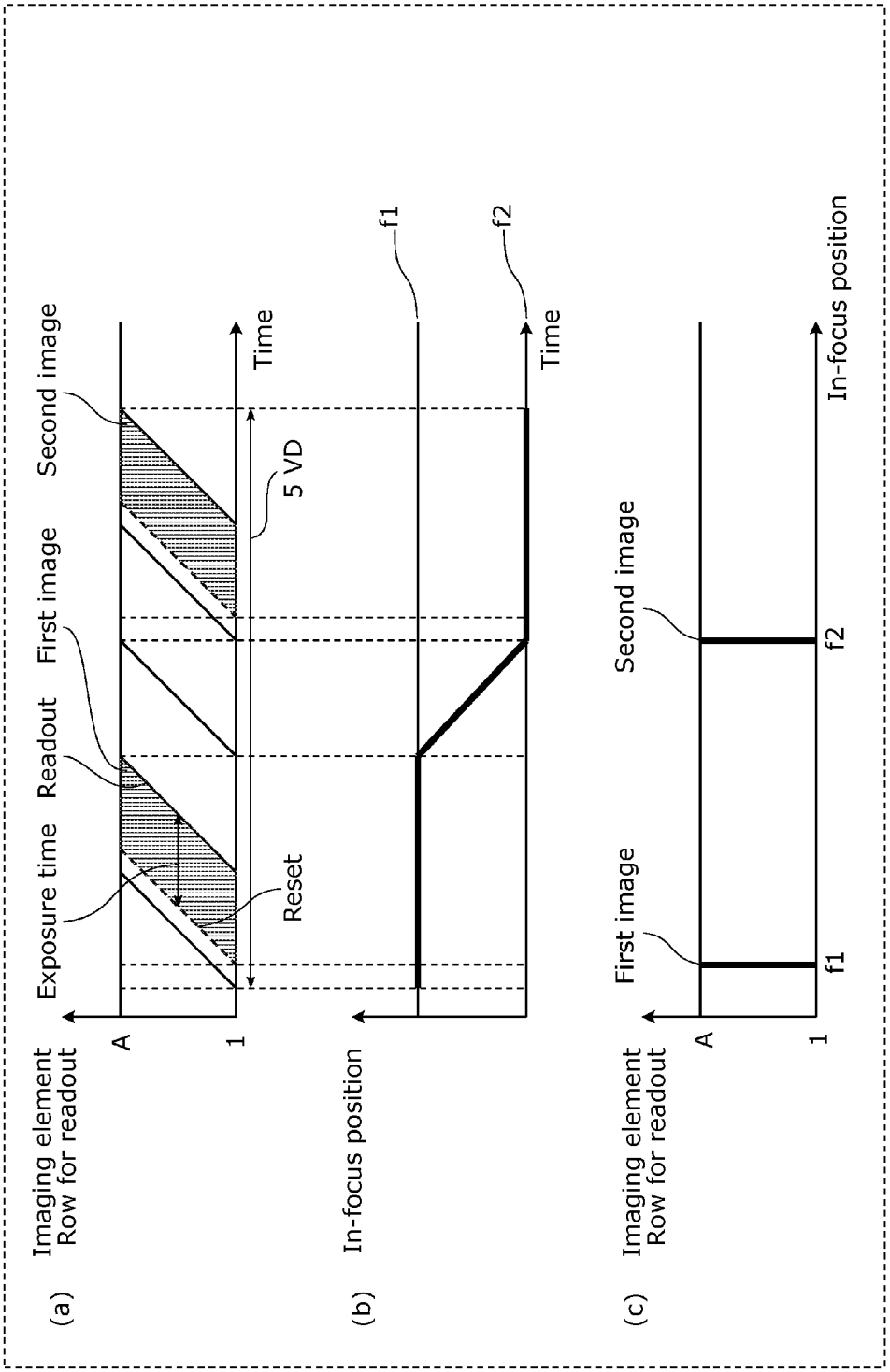
FIG. 5 explains an image capture operation, an in-focus position, and an in-focus range applied in a related art.

FIG. 5 explains an image capture operation, an in-focus position, and an in-focus range applied in the related art. Specifically, for comparison, FIG. 5 illustrates the same items as those in FIG. 4, for the case where the image capture method in (b) of FIG. 2 is used as a measure for the imaging element 14 including the rolling shutter.

In FIG. 5, (a) illustrates an image capture operation of the imaging element which is performed in the case where two images for use in the DFD are captured in the method of (b) in FIG. 2. In FIG. 5, (b) illustrates how the in-focus position moves in the case were the two images for use in the DFD are captured in the method of (b) in FIG. 2. In FIG. 5, (c) illustrates in-focus ranges obtained during the exposure of the two images for use in the DFD in the case where the two images are captured in the method of (b) in FIG. 2.

In this embodiment, as illustrated in (a) and (b) of FIG. 4, the in-focus position control unit 13 moves the in-focus position of the optical system 11 at constant speed from f1 (the in-focus position 1) to f2 (the in-focus position 2) on the imaging plane side between a point in time when the exposure of the first row in the imaging element 14 is started to obtain the first image and a point in time when the exposure of the A-th row in the imaging element 14 is completed to obtain the second image. Here, the concept of "constant speed" includes not only a strictly fixed speed but also a speed that varies within a range of speeds considered to be substantially equal. This also applies to other parts herein.

More detailed description is given with the use of symbols in FIG. 4. Assume that the point in time when the exposure of the first row in the imaging element 14 is started to obtain the first image is denoted by TS(1), a point in time when the exposure of the A-th row in the imaging element 14 is completed to obtain the first image is denoted by TE(1), a point in time when the exposure of the first row in the imaging element 14 is started to obtain the second image is denoted by TS(2), and the point in time when the A-th row in the imaging element 14 is completed to obtain the second image is denoted by TE(2). In this case, the in-focus position control unit 13 moves the in-focus position at constant speed from f1 to f2 on the imaging plane side in a period between TS(1) and TE(2). The method of moving the in-focus position is set by the in-focus position setting unit 12. The movement of the in-focus position is performed by the in-focus position control unit 13 with the use of the in-focus position set by the in-focus position setting unit 12.

Here, the in-focus position indicated in FIG. 4 is a position on the imaging plane side. Furthermore, for both the first image and the second image, the exposure time per row is set to the same, which is ⅘ of the length of time of 1VD. The image capture method as illustrated in FIG. 4 is premised on the Sweep DFD because the in-focus position is moved during the exposure. Furthermore, since the rolling shutter is used, the in-focus range during the exposure is different for each row in the imaging element 14.

In FIG. 4, (c) illustrates an in-focus range for each row in the imaging element 14, obtained during the exposure of images that are captured in the image capture method illustrated in (a) and (b) of FIG. 4. In-focus positions fa, fb, fc, and fd in (b) and (c) of FIG. 4 indicate in-focus positions obtained between the in-focus positions f1 and f2; those in (b) of FIG. 4 and those in (c) of FIG. 4 correspond to one another. Furthermore, since the in-focus position moves at constant speed on the imaging plane side, the distance between the in-focus positions f1 and fa, the distance between the in-focus positions fb and fc, and the distance between the in-focus positions fd and f2 are the same as the ratio of the length of time of 1VD and the exposure time is considered. The distance between the in-focus positions fa and fb and the distance between the in-focus positions fc and fd are the same. The distance between the in-focus positions f1 and fa is four times the distance between the in-focus positions fa and fb. For example, the in-focus position is f1 at a point in time when the exposure after resetting of electric charges in the first row in the imaging element 14 is started to obtain the first image. The in-focus position is fa at a point in time when electric charges after completion of the exposure in the first row in the imaging element 14 are read out to obtain the first image. Thus, for the first row in the imaging element 14, images in the range from the in-focus positions f1 to fa are accumulated evenly. Furthermore, the imaging-plane-side length of the in-focus range during the exposure is the same for each row, and the position of the in-focus range during the exposure shifts the same distance for each of the first row to the A-th row. Here, the concept of "the same" includes not only being exactly the same but also being in a range of that considered to be substantially the same. This also applies to other parts herein.

The distance measurement unit 16 calculates the object distance with Equation 3 by using the two images obtained as illustrated in FIG. 4. In Equation 3, it is necessary that one set of the J-staged point spread functions $h_1(d_j)$ and $h_2(d_j)$ (j=1, 2, . . . , J) is held in advance, and since the in-focus range is different for each row in the image capture method according to this embodiment illustrated in FIG. 4, it is also necessary to change the set of the point spread functions to be held $h_1$ and $h_2$ for each row. It should be noted that in the case of the image capture method according to this embodiment as illustrated in FIG. 4, since the DFD is performed on all the rows with the use of one set of the point spread functions $h_1$ and $h_2$, no change in the point spread functions $h_1$ and $h_2$ for each row will result in that the distance calculated by the distance measurement unit 16 is unfortunately different from an actual distance.

For this reason, after the distance correction amount calculation unit 18 calculates an amount of distance correction, the distance correction unit 17 corrects the distance calculated by the distance measurement unit 16, by calculation using the amount of correction calculated by the distance correction amount calculation unit 18. By doing so, the distance measurement apparatus 10 obtains an accurate distance to an object.

The distance correction amount calculation unit 18 determines an amount of distance correction for each row by determining a degree of approximation of the point spread functions based on the movement range of the in-focus position during the exposure for a distance to each object in each row in the imaging element 14. The distance correction unit 17 corrects the distance by subtracting from or adding to the distance calculated by the distance measurement unit 16, the amount of distance correction for each row in the imaging element 14 calculated by the distance correction amount calculation unit 18. The method of calculating an amount of distance correction and the method of correction are described in detail with reference to FIG. 6 and FIG. 7.

Figure 6:
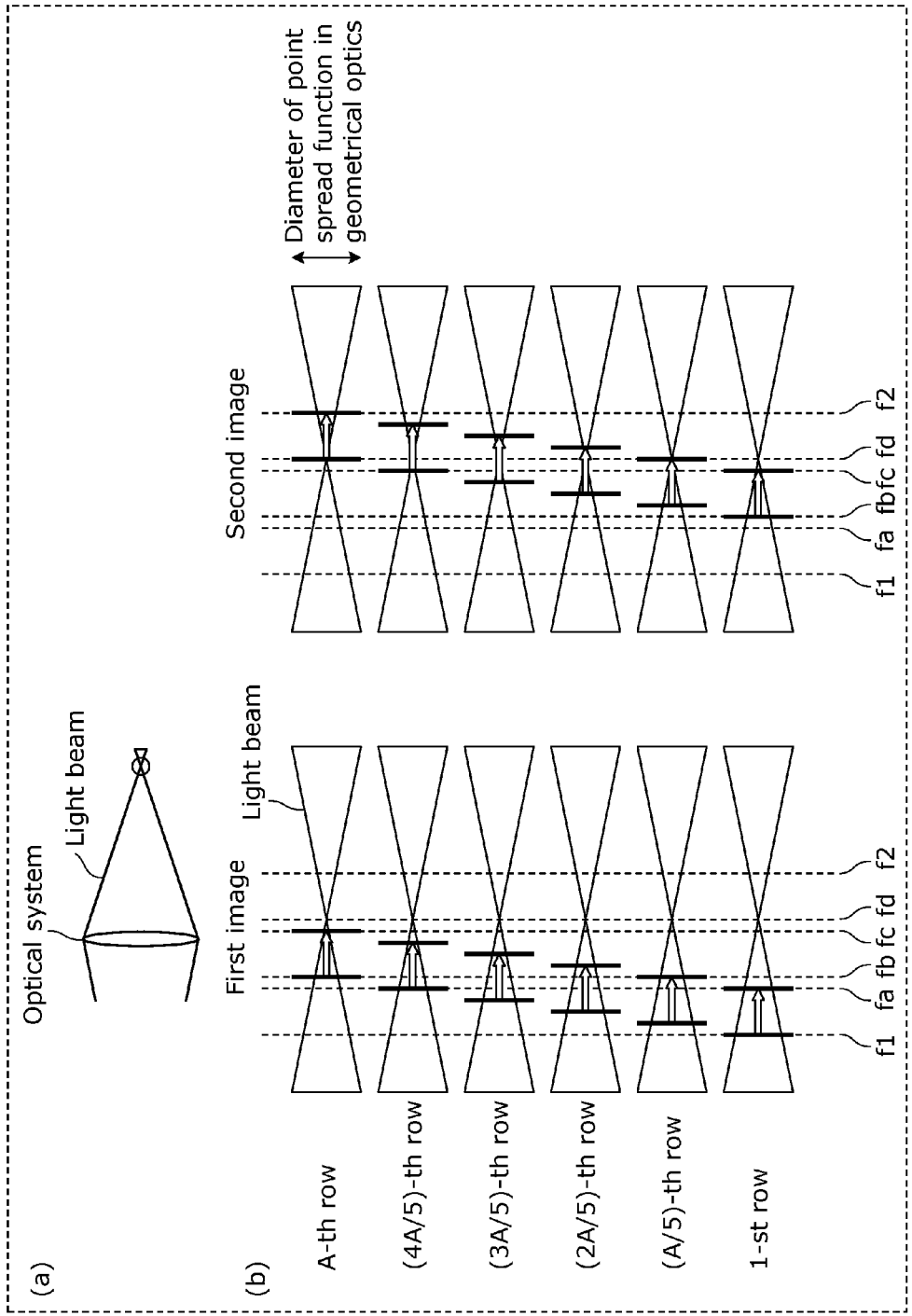
FIG. 6 is a first explanatory view of diameters of point spread functions in geometrical optics, accumulated in an imaging element, according to Embodiment 1.

FIG. 6 is a first explanatory view of diameters of point spread functions in geometrical optics, accumulated in the imaging element, according to Embodiment 1.

In FIG. 6, (a) illustrates a state in which light beams from an object are collected by an optical system, which is seen specifically in the case where the distance measurement apparatus 10 according to this embodiment is used in capturing two images for use in the DFD. In FIG. 6, (b) illustrates an enlarged view of a nearby area of a light-collecting position of the light beams enclosed by a circle in (a) of FIG. 6, which is obtained in the case where the distance measurement apparatus 10 according to this embodiment is used in capturing two images for use in the DFD, and indicates a diameter, in geometrical optics, of the point spread functions accumulated in each row in the imaging element 14, which is obtained in the case where an object located at a certain distance (the object distance at which the image is in focus at the in-focus position fd) is captured in the method illustrated in FIG. 4.

The amount of correction is calculated assuming that an object included in the entire region of the imaging element 14 is located at the same distance. In each row from the first row to the A-th row in the imaging element, the point spread functions with the in-focus positions included between the tail end to the tip of the arrow in (b) of FIG. 6 are accumulated. For example, in the first row of the imaging element 14, the point spread functions corresponding to the in-focus positions f1 to fa are accumulated for the first captured image, and the point spread functions corresponding to the in-focus positions fb to fc are accumulated for the second captured image. The figure shows that in the respective rows illustrated in (b) of FIG. 6, the diameters of the accumulated point spread functions are different, and the range of accumulation slightly changes in a linear fashion.

Figure 7:
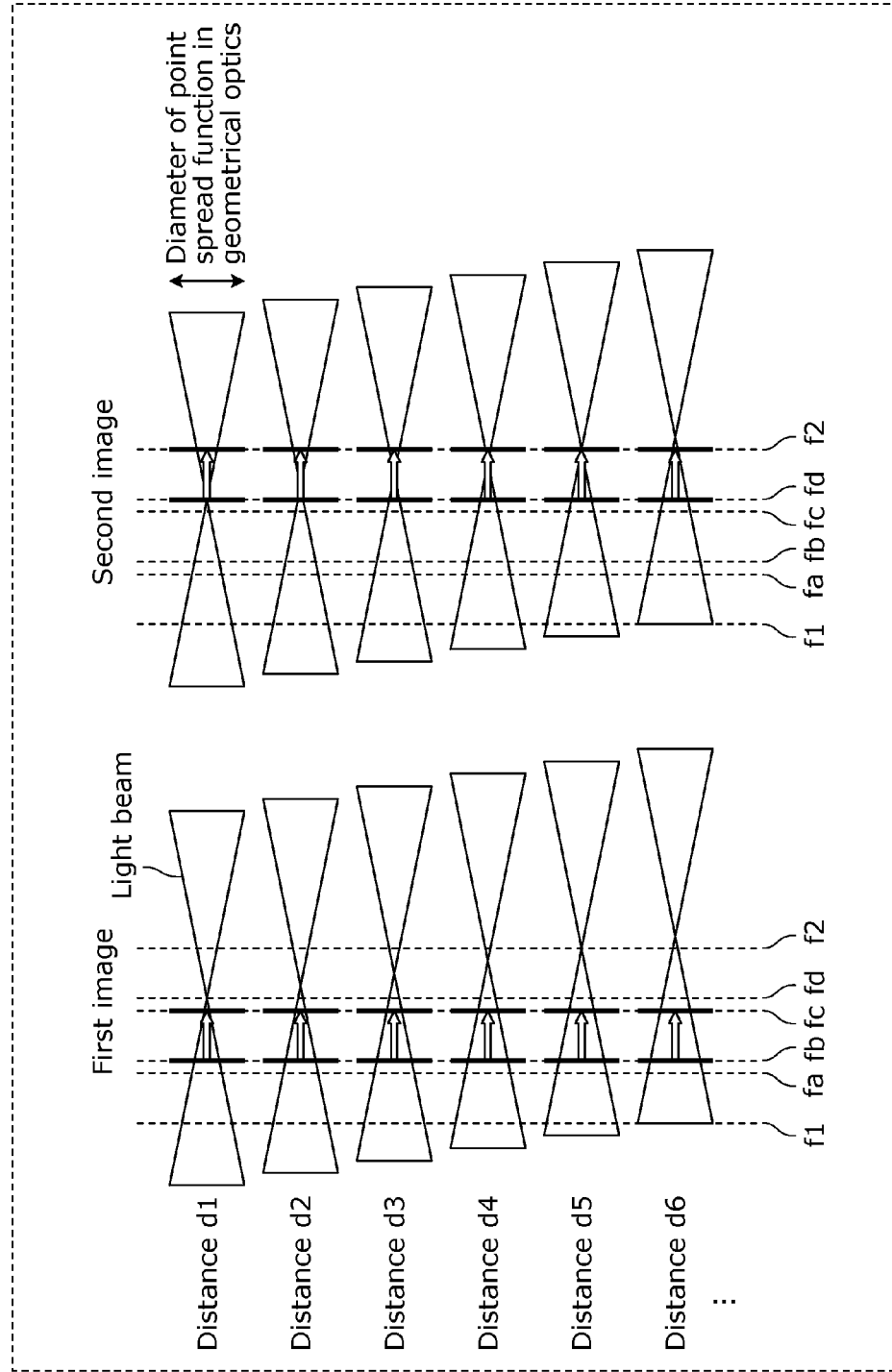
FIG. 7 is a second explanatory view of diameters of point spread functions in geometrical optics, accumulated in an imaging element, according to Embodiment 1.

FIG. 7 is a second explanatory view of diameters of point spread functions in geometrical optics, accumulated in the imaging element, according to Embodiment 1.

FIG. 7 illustrates an enlarged view of the nearby area of the light-collecting position of the light beams enclosed by the circle in (a) of FIG. 6, which is obtained in the case where the distance measurement apparatus 10 according to this Embodiment 1 is used in capturing two images for use in the DFD, and indicates, for each distance, a diameter, in geometrical optics, of the point spread functions accumulated in the A-th row in the imaging element, which is obtained in the case where an object located at a different distance is captured.

FIG. 7 illustrates, as with (b) of FIG. 6, an enlarged view of the light-collecting position of the light beams, and indicates, for each distance, a diameter, in geometrical optics, of the point spread functions accumulated in the A-th row in the imaging element 14, which is obtained in the case where an object located at a different distance is captured.

Here, the figure is drawn on the condition that the F number is the same for each of the distances. A distance $d_1$ is the same as the object distance indicated in (b) of FIG. 6, that is, an object distance at which the image is in focus at the in-focus position fd. The difference between adjacent distances $d_j$ and $(d_j+1)$ is set so that the in-focus positions on the imaging plane side are equally spaced. Specifically, the difference between the distance $d_j$ and the distance $(d_j+1)$ is set to be the same as the distance between the in-focus positions fa and fb. On the first image, the in-focus position moves from the in-focus position fb to the in-focus position fc during exposure. The figure shows that the diameter of the accumulated point spread functions is therefore different for each distance in the A-th row in the imaging element 14.

It should be noted that the distance measurement unit 16 is assumed in this embodiment to hold a set of the point spread functions $h_1(d_j)$ and $h_2(d_j)$ (j=1, 2, . . . , 3) indicated in FIG. 7. It is assumed in this set of the point spread functions that the image is in focus at the in-focus position fd when the distance is $d_1$, and the point spread functions are those accumulated for the A-th row in the imaging element 14 in the case where the image capture method in FIG. 4 is used to capture the image. The one set of the held point spread functions $h_1(d_j)$ and $h_2(d_j)$ (j=1, 2, . . . , J) includes 3 stages for each of $h_1$ and $h_2$, and $d_j$ (j=1, 2, . . . , J) in the point spread functions corresponds to the distances $d_1$, $d_2$, $d_3$, $d_4$, $d_5$, $d_6$, . . . indicated in FIG. 7. For example, the point spread function of the first image corresponding to the distance $d_1$ in FIG. 7 is $h_1(d_1)$.

Comparing (b) of FIG. 6 and FIG. 7 shows that the diameter of the point spread functions accumulated for a certain row in (b) of FIG. 6 and the diameter of the point spread functions accumulated for a certain distance in FIG. 7 have substantially the same values. With the same diameter of the accumulated point spread functions, the point spread functions accumulated and averaged as a result of the movement of the in-focus position during exposure will be the same.

For example, the diameter of the point spread functions accumulated for the (4A/5)-th row in (b) of FIG. 6 and the diameter of the point spread functions accumulated for the distance $d_2$ in FIG. 7 have substantially the same values. Likewise, the diameter of the accumulated point spread functions has substantially the same values between the respective combinations of the A-th, (3A/5)-th, (2A/5)-th, (A/5)-th, and first rows in (b) of FIG. 6 and the distances $d_1$, $d_3$, $d_4$, $d_5$, and $d_6$ in FIG. 7. Therefore, if one set of the held point spread functions $h_1$ and $h_2$ is used for all the rows in the imaging element 14 to determine a distance to an object by the Sweep DFD using Equation 3, a calculated distance will be different for each row even when all the captured objects are at the same distance.

The use of the point spread functions $h_1$ and $h_2$ held in this embodiment in the calculation will result in that, although the distance $d_1$ is calculated for the A-th row in the imaging element 14, the distances $d_6$, $d_5$, $d_4$, $d_3$, and $d_2$ are calculated respectively for the first, (A/5)-th, (2A/5)-th, (3A/5)-th, and (4A/5)-th rows in the imaging element 14 even when all the captured objects are at the distance $d_1$, causing a failure to obtain an accurate distance.

However, in the case where the in-focus position is moved at constant speed on the imaging plane side during the exposure to obtain two images as illustrated in FIG. 4, a difference in calculated distance between the rows can be easily corrected after the distance is calculated. When the object at the distance d, is captured, distances calculated for the first, (A/5)-th, (2A/5)-th, (3A/5)-th, (4A/5)-th, and A-th rows in the imaging element 14 are the distances $d_6$, $d_5$, $d_4$, $d_3$, $d_2$, and $d_1$, respectively. This shows, in other words, the calculated distances are different by one stage for each ⅕ row. In the cases, including the case of FIG. 6 and FIG. 7, where the in-focus position is moved at constant speed on the imaging plane side during the exposure of two images as illustrated in FIG. 4, the calculated distance is different by one stage for each row having a certain width, and an amount of such difference can be easily calculated. Thus, the amount of difference in calculated distance for each row is calculated, thereby determining an amount of distance correction for each row in advance, and the distance correction unit 17 corrects a distance for each row by using the calculated amount of correction, with the result that accurate distances can be obtained for all the rows.

In the case of FIG. 6 and FIG. 7 according to this embodiment, the amount of correction accumulated by the distance correction amount calculation unit 18 is five stages, four stages, three stages, two stages, and one stage for the first, (A/5)-th, (2A/5)-th, (3A/5)-th, and (4A/5)-th rows in the imaging element 14, respectively, and the distance correction unit 17 subtracts, from the distance calculated from the distance measurement unit 16, five stages, four stages, three stages, two stages, and one stage, respectively, for the first, (A/5)-th, (2A/5)-th, (3A/5)-th, and (4A/5)-th rows in the imaging element 14, with the result that accurate distances can be obtained. The amount of correction for the A-th row can be said to be a zero stage.

An amount of difference in calculated distance between the first row and the A-th row, denoted by $D_{diff}$ (the unit of measurement: stages), can be calculated with the use of drawings such as FIG. 6 and FIG. 7 based on a degree of approximation of the point spread functions, and can also be calculated with the use of Equation 4.

[Math. 4]

$$D_{diff} = \frac{ST_{VD}}{Ed} \quad \text{(Expression 4)}$$

In Equation 4: $D_{diff}$ represents an amount of difference in calculated distance between the first row and the A-th row in units of stage counts; S represents an amount of movement of the in-focus position that moves from a start of exposure for the first row in the first image to completion of exposure for the A-th row in the first image; $T_{VD}$ represents a length of time of 1VD; E represents a total length of time counting from a start of exposure for the first row in the first image to completion of exposure for the A-th row in the first image; and d represents a distance of movement of the in-focus position for one stage in distance. It may be that S represents an amount of movement of the in-focus position that moves from a start of exposure for the first row in the first image to completion of exposure for the A-th row in the second image, and E represents a total length of time counting from a start of exposure for the first row in the first image to completion of exposure for the A-th row in the second image.

As can be seen from FIG. 6 and FIG. 7, when, assuming the case of FIG. 7, one set of the point spread functions $h_1$ and $h_2$ is held and used in the calculation to calculate a distance in the distance measurement unit 16, measuring a distance to the object at the distance $d_1$ will result in that the distance for the A-th is calculated to be $d_1$ and the distance for the first row is calculated to be $d_6$.

Therefore, $D_{diff}$ is determined to be five stages based on the drawing, meaning that, for the first row, five stages needs to be subtracted from a distance calculated by the distance measurement unit 16. Furthermore, applying the values in FIG. 4, FIG. 6, and FIG. 7 to Equation 4 results in S being (the in-focus position f2−f1), E being (3−⅕)×TVD, d being (the in-focus position fa−fb), and (the in-focus position f2−f1) being equal to 14d, therefore resulting in $D_{diff}$=5, which matches the case determined based on the drawing.

The amount of difference for each row can be calculated using a ratio of $D_{diff}$ depending on which row between the first row and the A-th row is the current row; the amount of difference $D_{diff}(x)$ in calculated distance for the x-th row can be determined with Equation 5.

[Math. 5]

$$D_{diff}(x) = D_{diff} \frac{x}{A} \quad \text{(Expression 5)}$$

When $D_{diff}$ is a decimal, the decimal is treated by being, for example, rounded off to the nearest whole number or rounded up or down.

The distance correction unit 17 corrects the distance determined by the Sweep DFD by the distance measurement unit 16, by subtracting, from the distance, the value of Ddiff(x) calculated with the drawing or Equation 4 and Equation 5, for each row in the imaging element 14, with the result that an accurate distance can be obtained. It should be noted that when using Equation 5, it is necessary to count the rows in the imaging element not from the first row but from the zero-th row.

As above, the distance correction unit 17 adds or subtracts an amount of distance correction calculated by the distance correction amount calculation unit 18 assuming the case where objects included in the entire region of the imaging element 14 are at the same distance, to or from distances of objects located at various distances calculated by the distance measurement unit 16, with the result that an accurate distance to an object can be obtained.

This embodiment shows a method of determining a distance by the Sweep DFD using two images captured by the imaging element 14 including a rolling shutter. Under the condition that one set of the accumulated point spread functions $h_1(d_j)$ and $h_2(d_j)$ (j=1, 2, . . . , J) for use in the Sweep DFD is held in advance, a distance is calculated by the Sweep DFD and after such distance calculation, the distance is corrected.

Images are captured while the in-focus position is moved at constant speed on the imaging plane side from a start of exposure for the first row in the first image to completion of exposure for the A-th row in the second image. By capturing images in such an image capture method, it is possible to easily correct the calculated distance for each row. Unless the in-focus position is moved at constant speed, it is not possible to easily perform the correction for each row. As it is possible in this embodiment that a distance is calculated while the in-focus position is moved and the calculated distance is easily corrected so that an accurate distance is obtained, the DFD, which requires two or more images with different in-focus positions and ranges, can be efficiently performed at high speed.

Comparing the image capture method in this embodiment illustrated in (a) of FIG. 4 and the image capture method in the related art illustrated in (a) of FIG. 5 shows that the length of time to capture two images is shorter in this embodiment. Furthermore, the control on the in-focus position in FIG. 4 is not such a control to frequently move the in-focus position in reciprocation, but only a control to move the in-focus position in one direction. Therefore, the load on the in-focus position control unit 13 can be small and moreover, the power consumption that is needed to move the in-focus position can be low.

It is to be noted that although this embodiment describes the example in which the distance correction is performed at a point in time after the distance measurement unit 16 calculates a distance, the distance correction may be performed at a point in time before the distance calculation. In the case of correction before the distance calculation, the set of the point spread functions held in advance is shifted for each row by the number of stages for correction for the row, and is assigned to the functions in Equation 3. This means that the distance measurement unit 16 may calculate a distance after the distance d, which is an individual variable of the point spread function, is shifted by the number of stages for correction.

Furthermore, the correction before the distance calculation and the correction after the distance calculation may be combined. In the correction before the distance calculation, it may be that the set of point spread functions held in advance is held for each row so that a different set of the point spread functions is used to calculate a distance for each row; however, in this case, a large amount of memory is required to hold such data. By using a method of shifting, for each row, the set of point spread functions held in advance, by the number of stages for correction for the row, it is possible to reduce the amount of memory to hold such data.

It may also be possible to use, as one of the methods for the correction before the distance correction, a method of holding sets of point spread functions $h_1(d_j)$ and $h_2(d_j)$ (j=1, 2, . . . , J) for all the rows in advance, which are different for each row. In this case, it is possible to measure a distance by the DFD while freely moving the in-focus position during exposure even without a special method as in this embodiment, but in order to hold the sets of the point spread functions for all the rows, it is necessary to create point spread functions for each row based on a trajectory of the in-focus position in motion. In the case where an in-focus point does not move at constant speed on the imaging plane side, a weight for the point spread functions to be accumulated needs to be calculated based on exposure time for each in-focus position, making it complicated to create a point spread function. Furthermore, it is necessary to hold data of the point spread functions for all the rows in a camera and a lens, meaning that a large amount of memory is required to hold such data. In contrast, in this embodiment, the necessary number of sets of point spread functions is only one, and it is sufficient that a weight for the point spread functions to be accumulated is the same for each in-focus position, making it easy to calculate a point spread function.

It should be noted that although a distance is calculated using two images in this embodiment, N images may be used to calculate a distance where N is no less than 2. In this case, the in-focus position is moved at constant speed on the imaging plane side from a start of exposure for the first row in the first image to completion of exposure for the A-th row in the N-th image.

It may be that (N−2) images among the N images except two consecutive images are captured in the manner as in the related art (FIG. 5) that an image is captured with the in-focus position stopped during exposure, instead of the manner as in this embodiment (FIG. 4) that an image is captured with the in-focus position moving during exposure. In this case, point spread functions for the case of the stopped in-focus positions are held in advance for the (N−2) images, and the distance correction is limited to the correction performed at a point in time before the distance measurement unit 16 calculates a distance.

It should be noted that although the in-focus position control unit 13 moves the imaging element 14 to move the in-focus position in this embodiment, a focus lens included in the optical system 11 may be moved to move the in-focus position.

In this embodiment, in order to create the point spread functions accumulated for use in the Sweep DFD which are to be held in advance, the method used is such that the point spread functions for two or more in-focus positions within the movement range of the in-focus position are output in optical simulation and averaged in the later calculation. Instead, a method of calculation using a model function, a method using actual measurement, or the like method may be used for the creation. The method using a model function and the method using actual measurement include a method of directly modeling the accumulated point spread functions and conducting actual measurement or a method of calculating point spread functions for respective in-focus positions, conducting actual measurement, and then accumulating the point spread functions.

It should be noted that although one distance image is calculated in this embodiment, distance images may be consecutively calculated as video. In this case, with reference to FIG. 4, the in-focus position may be moved at constant speed during exposure for the third image to an in-focus position 3 which is away from an in-focus position 2f2 by the distance between an in-focus position 1f1 and an in-focus position 2f2 on the imaging plane side. In such a case, it is recommended to additionally hold corresponding point spread functions in advance and perform the Sweep DFD using such a corresponding relationship between the in-focus positions and the point spread functions.

It may also be that after 1VD since the completion of exposure for the second image, the in-focus position is moved at constant speed in the opposite direction this time from the in-focus position f1 toward f2 on the imaging plane side. In this case, it is recommended to additionally hold corresponding point spread functions for the movement of the in-focus position in the opposite direction and perform the Sweep DFD using such a corresponding relationship between the in-focus positions and the point spread functions.

Instead, it may be that after 1VD since the completion of exposure for the second image, the in-focus position is moved to f1 and the same or like image capture method as in FIG. 4 is used again to capture images.

Alternatively, it may be that after 1VD since the completion of exposure for the second image, the in-focus position is moved to a given position during next 1VD, and assuming the in-focus position f1 and the in-focus position f2 in FIG. 4 as given in-focus position 1' and in-focus position 2', the same or like framework is used to capture images. In this case, it is recommended to additionally hold corresponding point spread functions in advance and perform the Sweep DFD using such a corresponding relationship between the in-focus positions and the point spread functions. Although the method of consecutively calculating distance images as video has been described, any method other than the described method may be used as long as such a method includes this embodiment in the process of consecutively calculating distance images as video.

It should be noted that although the calculation to determine the amount of correction and the correction process are performed for each row in the imaging element 14 in this embodiment, the calculation to determine the amount of correction and the correction process may be performed for each group of two or more rows.

It should be noted that although the set of the point spread functions assumed for the A-th row in the imaging element 14 is held in this embodiment, it may be possible to hold point spread functions assumed for another row. Even in such a case, a relative value of the amount of correction calculated in this embodiment will not be different. For example, the amounts of correction calculated in this embodiment are five stages and zero stage for the first row and the A-th row, respectively, the difference of which is five stages. If the point spread functions assumed for the given x-th row are held, the amount of correction for the x-th row is zero, meaning that it is possible to newly determine an amount of correction based on the distance from the x-th row to the first row and the distance from the x-th row to the A-th row while the difference in the amount of correction between the first row and the A-th row is still five stages. Suppose that the x-th row is the (3A/5)-th row, the amount of correction for the first row is minus three stages, and the amount of correction for the A-th row is plus two stages, the difference of which is five stages. The amount of correction between not only the first row and the A-th row but also any rows therebetween may be calculated likewise.

It should be noted that although the exposure time for the first image and the exposure time for the second image are the same in this embodiment, this is not only the example; the exposure time for the first image and the exposure time for the second image are not required to be the same. In this case, it is sufficient that a captured image is weighted according to the exposure time and furthermore, the point spread functions $h_1(d_j)$ and $h_2(d_j)$ (j=1, 2, ..., J) are held according to the exposure time and the method of moving the in-focus position.

It should be noted that although the point spread functions are held in advance in this embodiment, it may be that in the case of using a model function as the point spread function or the case of performing the calculation that involves accumulating and averaging the point spread functions, the point spread functions are not held in advance, but are calculated every time when the point spread functions are needed.

It should be noted that about the distance measurement methods described above, which include small changes added to distance measurement method in this embodiment, a new point spread function or a new set of point spread functions is supposed to be added in the case where the changes require such a new point spread function or a new set of point spread functions. Furthermore, in the case where there is no need to add a new point spread function or a new set of point spread functions since substitution is possible, including shifting the already held set of point spread functions, it is possible to choose whether to add a new point spread function or a new set of point spread functions or to use the already held set of point spread functions by shifting or the like.

Embodiment 2

This embodiment describes a distance measurement apparatus that calculates information on a distance to an object with respect to a part of an imaging area which is captured by the imaging element. It should be noted that the structural elements that are the same or alike as the structural elements in Embodiment 1 have the same reference numerals as in Embodiment 1; as such, detailed descriptions thereof will be omitted in some instances.

Figure 8:
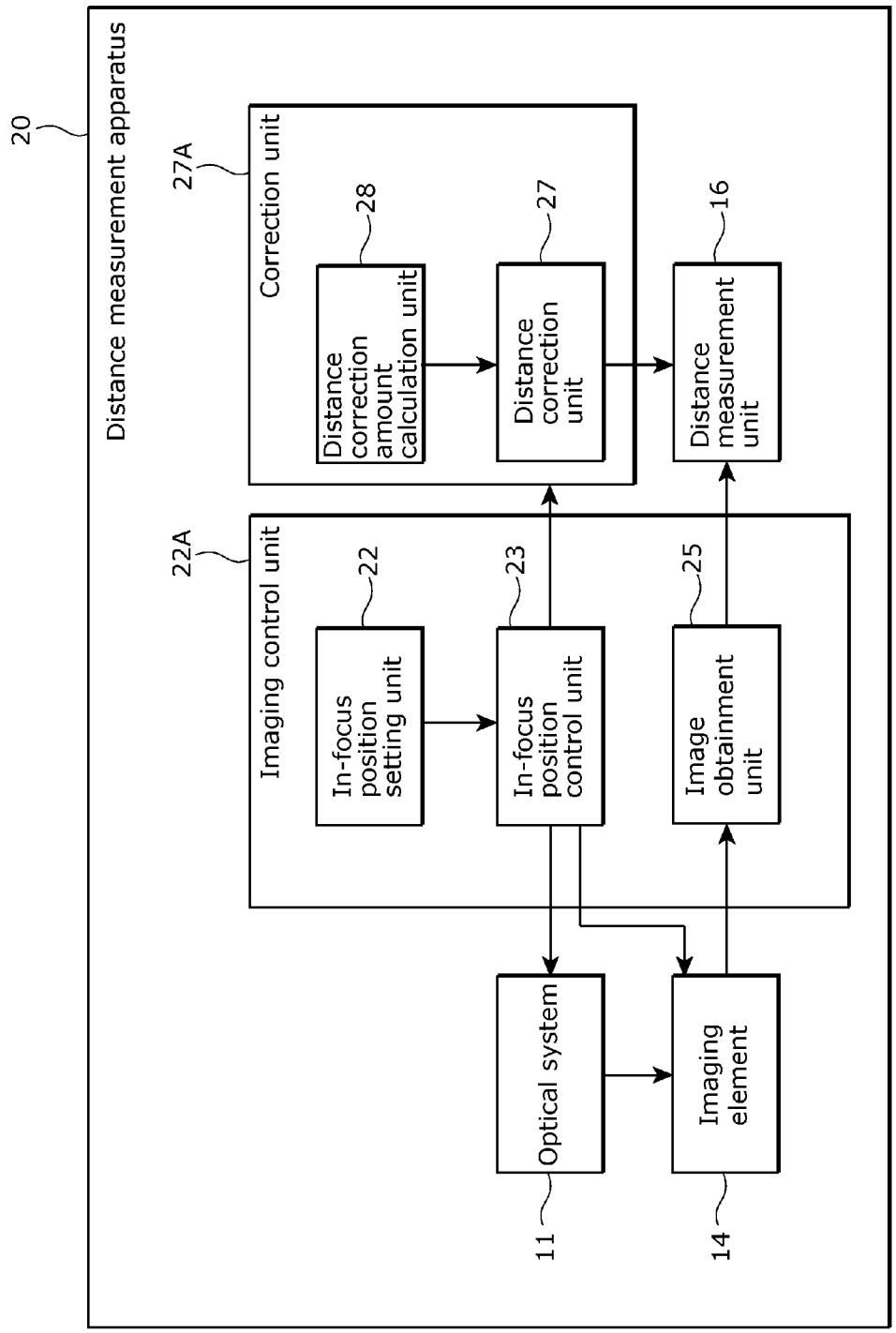
FIG. 8 is a block diagram illustrating a structure of a distance measurement apparatus according to Embodiment 2.

FIG. 8 is a block diagram illustrating a structure of the distance measurement apparatus according to this embodiment.

As illustrated in FIG. 8, a distance measurement apparatus 20 includes the optical system 11, an in-focus position setting unit 22, an in-focus position control unit 23, the imaging element 14, an image obtainment unit 25, the distance measurement unit 16, a distance correction unit 27, and a distance correction amount calculation unit 28.

The in-focus position setting unit 22, the in-focus position control unit 23, and the image obtainment unit 25 may be collectively referred to as an imaging control unit 22A. The distance correction unit 27 and the distance correction amount calculation unit 28 may be collectively referred to as a correction unit 27A.

The optical system 11 forms an object image on the imaging element 14. Furthermore, the in-focus position of the optical system 11 on the imaging plane side can be controlled.

The in-focus position setting unit 22 sets how to move the in-focus position in capturing images for use in the DFD.

The in-focus position control unit 23 controls an actual location of an in-focus position using the in-focus position set by the in-focus position setting unit 12.

The in-focus position control unit 23 is formed of an actuator and controls the in-focus position by moving the imaging element 14 along an optical axis thereof.

The imaging element 14 is a CMOS sensor including a rolling shutter. The imaging element 14 includes pixels arranged two-dimensionally (in rows and columns) and each including a photoelectric conversion element, and images an object by sequentially performs exposure and readout of electric charges or electric signals for each of the rows or each of the columns, thereby generating image data thereof. It should be noted that although this embodiment explains, as an example, a case where the imaging element 14 performs the exposure and the readout of electric charges sequentially for each of the rows and is made up of the "A" number of rows, the present invention is not limited to this example.

The image obtainment unit 25 obtains two or more images from the imaging element 14 and holds the obtained images.

The distance measurement unit 16 measures a distance by the DFD using two or more images captured from a single viewpoint and focused at different distances.

The distance correction unit 27 performs a correction process for correcting a difference in distance attributed to the rolling shutter, before the distance measurement unit 16 measures a distance or after the distance measurement unit 16 measures a distance.

The distance correction amount calculation unit 18 calculates, for each row in the imaging element 14, an amount of correction that is to be used in the correction process performed by the distance correction unit 27.

Figure 9:
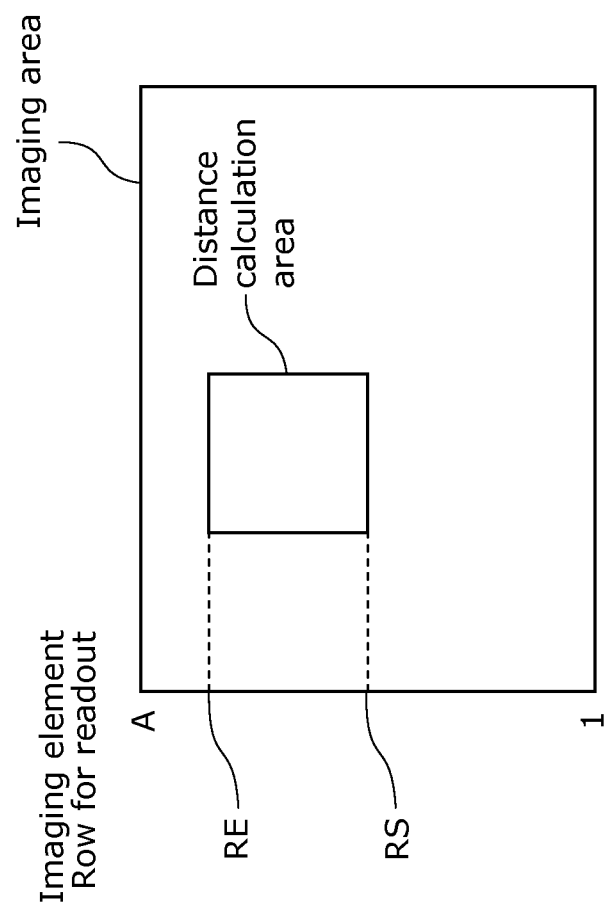
FIG. 9 is an explanatory view of an area from which a distance is measured using a distance measurement apparatus according to Embodiment 2.

FIG. 9 is an explanatory view of an area from which a distance is measured using the distance measurement apparatus according to this embodiment. Specifically, FIG. 9 is illustration indicating, out of the entire imaging area, an area from which the distance measurement apparatus 20 measures a distance.

In this embodiment, the distance calculation by the Sweep DFD is intended for a part of the imaging area. FIG. 9 indicates a distance calculation area inside the imaging area. The inner area of a square denoted as the distance calculation area in FIG. 9 is subject to the distance calculation. The first row and the last row in the distance calculation area in FIG. 9 are denoted by RS and RE, respectively. In this embodiment, the ratio of the distance from the first row to the RS-th row, the distance from the RS-th row to the RE-th row, and the distance from the RE-th row to the A-th row in the imaging element 14 is set to 10:7:3.

Figure 10:
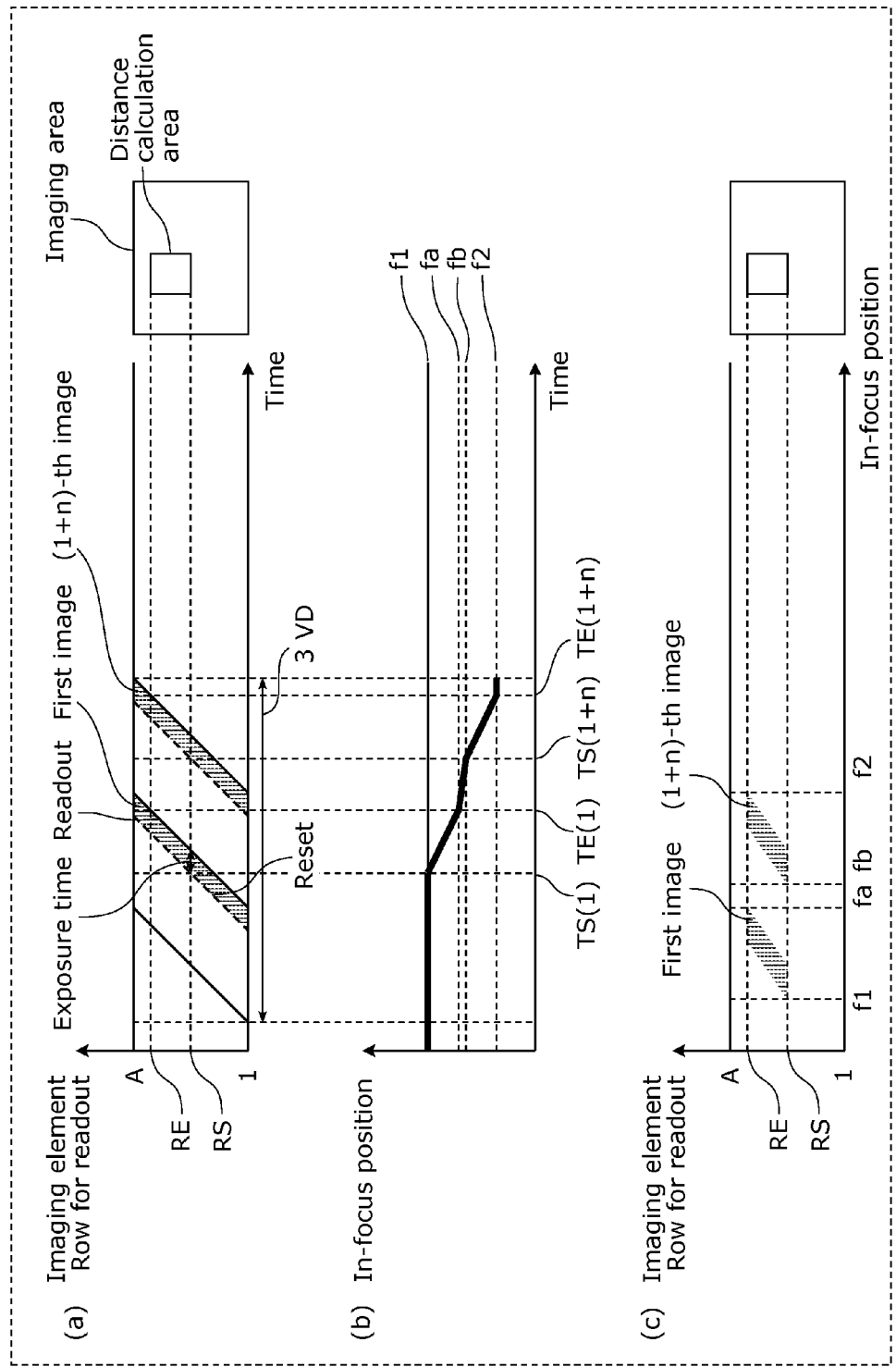
FIG. 10 explains an image capture operation, an in-focus position, and an in-focus range applied when an image is captured using a distance measurement apparatus according to Embodiment 2.

FIG. 10 explains an image capture operation, an in-focus position, and an in-focus range applied when an image is captured using the distance measurement apparatus according to Embodiment 2. Specifically, in FIG. 10, (a) illustrates an image capture operation of the imaging element performed when the n-th and (n+1)-th images for use in the DFD are captured using the distance measurement apparatus 20 according to this embodiment. In FIG. 10, (b) illustrates how the in-focus position moves when the n-th and (n+1)-th images for use in the DFD are captured using the distance measurement apparatus 20 according to this embodiment. In FIG. 10, (c) illustrates an in-focus range obtained while, when the n-th and (n+1)-th images for use in the DFD are captured using the distance measurement apparatus 20 according to this embodiment, the distance calculation area, illustrated in FIG. 9, of each of the two images is exposed.

The following describes how the DFD is performed using the n-th and (n+1)-th images counted from given timing T with a CMOS sensor including the rolling sensor in this embodiment. Here, n≤1. In this embodiment, suppose n=1.

In this embodiment, as illustrated in (a) and (b) of FIG. 10, the in-focus position is moved at constant speed on the imaging plane side in the period from a start of exposure for the first row in the distance calculation area in the first image to completion of exposure for the last row in the distance calculation area in the (1+n)-th image and in the period from a start of exposure for the first row in the distance calculation area in the (1+n)-th image to completion of the last row in the distance calculation area in the (1+n)-th image. The method of moving the in-focus position is set by the in-focus position setting unit 22. The movement of the in-focus position is performed by the in-focus position control unit 13 using the in-focus position set by the in-focus position setting unit 12.

Here, the in-focus position indicated in FIG. 10 is a position on the imaging plane side. Furthermore, for both the first image and the (1+n)-th image, the exposure time per row is set to the same, which is ⅕ of the length of time of 1VD. In FIG. 10, TS(1) denotes a point in time when exposure for the RS-th row in the imaging element 14 is start to obtain the first image, TE(1) denotes a point in time when exposure for the RE-th row in the imaging element 14 is completed to obtain the first image, TS(1+n) denotes a point in time when exposure for the RS-th row in the imaging element 14 is started to obtain the (1+n)-th image, and TE(1+n) denotes a point in time when exposure for the RE-th row in the imaging element 14 is completed to obtain the (1+n)-th image.

Firstly, in the period until TS(1), the in-focus position is stopped at f1. The in-focus position is then moved at constant speed from f1 to fa on the imaging plane side in the period from TS(1) to TE(1). Next, in the period from TE(1) to TS(1+n), the in-focus position is moved at constant speed from fa to fb on the imaging plane side. As to the movement of the in-focus position in the period from TE(1) to TS(1+n), the in-focus position is moved at constant speed on the imaging plane side in this embodiment, but the in-focus position may not be moved at constant speed on the imaging plane side. Next, the in-focus position is moved at constant speed from fb to f2 on the imaging plane side in the period from TS(1+n) to TE(1+n). After TE(1+n), the in-focus position is stopped at f2. It should be noted that the speeds at which the in-focus position is moved on the imaging plane side between TS(1) and TE(1) and between TS(1+n) and TE(1+n) are set to the same speed.

FIG. 10 illustrates, in (c), the in-focus range obtained during exposure for each row included in the distance calculation area in the imaging element 14, which is illustrated in FIG. 9, when the images are captured by the image capture method illustrated in (a) and (b) of FIG. 10. In FIG. 10, (c) omits illustration of an in-focus range obtained during exposure for other rows than the rows included in the distance calculation area in the imaging element 14, which is illustrated in FIG. 9, when the images are captured by the image capture method illustrated in (a) and (b) of FIG. 10. The in-focus positions fa and fb in (b) and (c) of FIG. 10 indicate in-focus positions obtained between the in-focus positions f1 and f2; those in (b) of FIG. 10 and those in (c) of FIG. 10 correspond to one another. The distance between the in-focus positions f1 and fa and the distance between the in-focus positions fb and f2 are the same. Furthermore, the distance between the in-focus positions f1 and fa and the distance between the in-focus positions fa and fb in this embodiment are respectively set to the same as the distance between the in-focus positions f1 and fa and the distance between the in-focus positions fa and fb in Embodiment 1.

This embodiment is also premised on the Sweep DFD, allowing a distance to be calculated using the same or like methods of calculating a distance, calculating an amount of distance correction, correcting the calculated distance, and creating accumulated point spread functions to be held in advance as those in Embodiment 1.

A difference in the amount of correction between the RS-th row and the RE-the row in the imaging element 14, which is calculated by the distance correction amount calculation unit 18, can be calculated based on a degree of approximation of the point spread functions as in the case of Embodiment 1. It should be noted that even in this embodiment, a difference in the amount of correction between the RS-th row and the RE-th row in the imaging element 14, which is calculated by the distance correction amount calculation unit 18, is about 2.55 stages, in the case where the distances $d_1$, $d_2$, . . . , are set to the same as those in Embodiment 1 and one set of new accumulated point spread functions $h_1(d_j)$ and $h_2(d_j)$ (j=1, 2, . . . , J) for use in the Sweep DFD according to this embodiment is held in advance assuming the RE-th row. An amount of correction for a row between the RS-th row and the RE-th row can be calculated using a ratio depending on which row between the RS-th row and the RE-th row is the current row. In the case of using Equation 4; the calculation may be performed where $D_{diff}$ represents an amount of difference in calculated distance between the RS-th row and the RE-row in units of stage counts; S represents an amount of movement of the in-focus position that moves from a start of exposure for the RS-th row in the first image to completion of exposure for the RE-th row in the first image; $T_{VD}$ represents time taken to read out electric charges throughout rows from the RS-th row to the RE-th row; E represents a total length of time counting from a start of exposure for the RS-th row in the first image to completion of exposure for the RE-th row in the first image; and d represents a distance of movement of the in-focus position for one stage in distance.

With the structure according to this embodiment, the period in which the in-focus position needs to be moved at constant speed on the imaging plane side can be limited, with the result that the in-focus position can be moved and stopped freely at a point in time out of the period. In FIG. 10, since the period from TS(1) to TE(1) and the period from TS(1+n) to TE(1+n) correspond to the exposure time for the distance calculation area, there is no need to limit the speed at which the in-focus position is moved at a point in time other than those periods.

It is to be noted that although the distance correction is performed at a point in time after the distance measurement unit 16 calculates a distance in this embodiment, the distance correction may be performed at a point in time before the distance calculation. In the case of correction before the distance calculation, the set of the point spread functions held in advance is shifted for each row by the number of stages for correction for the row, and is assigned to the functions in Equation 3. Furthermore, the correction before the distance calculation and the correction after the distance calculation may be combined. In the correction before the distance calculation, it may be that the set of point spread functions held in advance is held for each row so that a different set of the point spread functions is used to calculate a distance for each row; however, in this case, a large mount of memory is required to hold such data. By using a method of shifting, for each row, the set of point spread functions held in advance, by the number of stages for correction for the row, it is possible to reduce the amount of memory to hold such data.

It may also be possible to use, as one of the methods for the correction before the distance correction, a method of holding sets of point spread functions $h_1(d_j)$ and $h_2(d_j)$ ($j=1, 2, \ldots, J$) for all the rows in advance, which are different for each row. In this case, it is possible to measure a distance by the DFD while freely moving the in-focus position during exposure even without a special method as in this embodiment, but in order to hold the sets of the point spread functions for all the rows, it is necessary to create point spread functions for each row based on a trajectory of the in-focus position in motion. In the case where an in-focus point does not move at constant speed on the imaging plane side, a weight for the point spread functions to be accumulated needs to be calculated based on exposure time for each in-focus position, making it complicated to create a point spread function. Furthermore, it is necessary to hold data of the point spread functions for all the rows in a camera and a lens, meaning that a large amount of memory is required to hold such data. In contrast, in this embodiment, the necessary number of sets of point spread functions is only one, and it is sufficient that a weight for the point spread functions to be accumulated is the same for each in-focus position, making it easy to calculate a point spread function.

It should be noted that although a distance is calculated using two images, the first image and the (1+n)-th image counted from a given point in time T, in this embodiment, N images may be used to calculate a distance where N is no less than 2. In this case, it is sufficient that the in-focus position is moved at constant speed on the imaging plane side during exposure for the RS-th row to the RE-row in the imaging element 14 in the period from a start of exposure for the first row in the first image to completion of exposure for the A-th row in the N-th image.

It may be that (N−2) images among the N images except two consecutive images are captured in the manner as in the related art (FIG. 5) that an image is captured with the in-focus position stopped during exposure, instead of the manner as in Embodiment 1 (FIG. 4) that an image is captured with the in-focus position moving during exposure. In this case, point spread functions for the case of the stopped in-focus positions are held in advance for the (N−2) images, and the distance correction is limited to the correction performed at a point in time before the distance measurement unit 16 calculates a distance.

It should be noted that although the in-focus position control unit 13 moves the imaging element 14 to move the in-focus position in this embodiment, a focus lens included in the optical system 11 may be moved to move the in-focus position.

In this embodiment, in order to create the point spread functions accumulated for use in the Sweep DFD which are to be held in advance, the point spread functions for two or more in-focus positions within the movement range of the in-focus position are output in optical simulation and averaged in the later calculation. Instead, a method of calculation using a model function, a method using actual measurement, or the like method may be used for the creation. The method using a model function and the method using actual measurement include a method of directly modeling the accumulated point spread functions and conducting actual measurement or a method of calculating point spread functions for respective in-focus positions, conducting actual measurement, and then accumulating the point spread functions.

Although the in-focus position is stopped at f1 in the period from a point in time before TS(n) to the point in time TS(n) in this embodiment, this is not the only example; any movement of the in-focus position is possible in the period from a point in time before TS(n) to the point in time TS(n) as long as the in-focus position has been completed to move to the in-focus position f1 at the point in time TS(n).

Furthermore, although the in-focus position is moved at constant speed from the in-focus position fa to the in-focus position fb on the imaging plane side at points in time from TE(n) to TS(n+1) in this embodiment, this is not the only example; any movement of the in-focus position is possible at points in time from TE(n) to TS(n+1) as long as the in-focus position has been completed to move to the in-focus position fb at the point in time TS(n+1).

Furthermore, although the in-focus position is stopped at the in-focus position 2f2 at a point in time after TE(n+1) in this embodiment, this is not the only example; any movement of the in-focus position is possible at a point in time after TE(n+1).

It should be noted that although the amount of movement of the in-focus position is the same on the imaging plane side in the periods from TS(1) to TE(1) and from TS(1+n) to TE(1+n) in this embodiment, the amount of movement of the in-focus position is not required to be substantially the same in the periods from TS(1) to TE(1) and from TS(1+n) to TE(1+n) when TE(1)≤TS(1+n). When TE(1)>TS(1+n), the same or like conditions as in Embodiment 1 will apply.

Furthermore, it may be that the image capture method in Embodiment 1 is used when TE(1)>TS(1+n), and a selected one of the image capture method in this embodiment and a method 2' described below can be used when TE(1)≤TS(1+n). In the method 2', with reference to FIG. 10, the in-focus position is stopped at f1 in the period from TS(1) to TE(1); the in-focus position is moved to f3, which is different from f1, in the period from TE(1) to TS(1+n); and the in-focus position is stopped at f3 in the period from TS(1+n) to TE(1+n). The method 2' adopts the normal DFD instead of the Sweep DFD.

The following gives generalized descriptions. Suppose consecutive images, the (1+x)-th and the (1+x+1)-th image, among (1+n) captured images where n≥1 and (n−1)≥x≥0, a point in time to start exposure for the RS-th row in the (1+x)-th image, a point in time to complete exposure for the RE-th row, in the (1+x)-th image, a point in time to start exposure for the RS-th row in the (1+x+1)-th image, and a point in time to complete exposure for the RE-th row in the (1+x+1)-th image are set to TS(1+x), TE(1+x), TS(1+x+1), and TE(1+x+1), respectively, and when TE(1+x)≤TS(1+x+1), the amount of movement of the in-focus position is not required to be the same for the period from TS(1+x) to TE(1+x) or a point in time therein and the period from TS(1+x+1) to TE(1+x+1) or a point in time therein. Here, when TE(1+x)>TS(1+x+1), the same or like conditions as in Embodiment 1 will apply.

It may also be that the image capture method in Embodiment 1 is used when TE(1+x)>TS(1+x+1), and a selected one of the image capture method in this embodiment and the method 2' described below can be used when TE(1+x)≤TS (1+x+1). In the method 2', with reference to FIG. 10, the in-focus position is stopped at f1 in the period from TS(1+x) to TE(1+x); the in-focus position is moved to f3, which is different from f1, in the period from TE(1+x) to TS(1+x+1); and the in-focus position is stopped at f3 in the period from TS(1+x+1) to TE(1+x+1).

It may also be that the distance measurement apparatus 20 includes an exposure sequence determination unit (not illustrated) which determines a sequence of the points in time TE(1+x) and TS(1+x+1), and the exposure sequence determination unit determines whether the exposure sequence is TE(1+x)>TS(1+x+1) or TE(1+x)≤TS(1+x+1).

It should be noted that although one distance image is calculated in this embodiment, distance images may be consecutively calculated as video. In this case, it may be that the in-focus position is moved to f1 in the period from TE(n+1) to TS(n+2), and the (n+2)-th image and the (n+3)-th image are captured in the same or like method as with the n-th image and the (n+1)-th image in FIG. 10. Alternatively, the (n+2)-th image and the (n+3)-th image may be captured with different in-focus positions or ranges from those for the n-th image and the (n+1)-th image. In this case, it is sufficient that corresponding point spread functions are additionally held in advance.

Although the method of consecutively calculating distance images as video has been described, any method other than the described method may be used as long as such a method includes this embodiment in the process of consecutively calculating distance images as video.

It should be noted that although this embodiment has described that the calculation to determine the amount of correction and the correction process are performed for each row in the imaging element 14, the calculation to determine the amount of correction and the correction process may be performed for each group of two or more rows in the imaging element 14.

It should be noted that although the set of the point spread functions assumed for the RE-th row in the imaging element 14 is held in this embodiment, it may be possible to hold point spread functions assumed for another row. Even in such a case, a relative value of the amount of correction calculated in this embodiment will not be different.

It should be noted that although the exposure time for the first image and the exposure time for the (1+n)-th image are the same in this embodiment, this is not only the example; the exposure time for the first image and the exposure time for the (1+n) image are not required to be the same. In this case, it is sufficient that a captured image is weighted according to the exposure time and furthermore, the point spread functions $h_1(d_j)$ and $h_2(d_j)$ (j=1, 2, ..., J) are held according to the exposure time and the method of moving the in-focus position.

It should be noted that although the distance calculation area is set to the area illustrated in FIG. 9 in this embodiment, this is not the example; it is possible to set any area included in the range from the first row to the A-th row in the imaging element 14.

It should be noted that although the speed at which the in-focus position is moved on the imaging plane side is the same for the period from TS(1) to TE(1) and the period from TS(1+n) to TE(1+n) in this embodiment, the speed at which the in-focus position is moved is not required to be the same for these period when TE(1)≤TS(1+n). However, in this case, the distance correction is limited to the correction performed at a point in time before the distance measurement unit 16 calculates a distance.

It should be noted that although the point spread functions are held in advance in this embodiment, it may be that in the case of using a model function as the point spread function or the case of performing the calculation that involves accumulating and averaging the point spread functions, the point spread functions are not held in advance, but are calculated every time when the point spread functions are needed.

It should be noted that about the distance measurement methods described above, which include small changes added to distance measurement method in this embodiment, a new point spread function or a new set of point spread functions is supposed to be added in the case where the changes require such a new point spread function or a new set of point spread functions. Furthermore, in the case where there is no need to add a new point spread function or a new set of point spread functions since substitution is possible, including shifting the already held set of point spread functions, it is possible to choose whether to add a new point spread function or a new set of point spread functions or to use the already held set of point spread functions by shifting or the like.

It should be noted that in all the examples, variations in speed that can usually occur in an actuator, such as variations in speed that are attributed to cogging in a stepping motor, are within the range of speeds that are considered to be substantially constant.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the distance measurement apparatus according to each of the above-described embodiments is a program described below.

Specifically, the program causes a computer to execute a distance measurement method which is used by a distance measurement apparatus including: an imaging element that includes photoelectric conversion elements arranged in rows and columns, and images an object by performing exposure and readout of electric charges sequentially for each of the rows or each of the columns; and an optical system that is for forming an image of the object on the imaging element and has an in-focus position that is controllable, and the distance measurement method includes: (i) controlling the optical system to cause the in-focus position to move at constant speed and (ii) causing the imaging element to image the object sequentially while the in-focus position is being moved at the constant speed, to obtain a plurality of blurred images; measuring a distance from a reference position in the optical system to the object using the plurality of blurred images and a point spread function dependent on object distance; and performing, before or after the measurement of the distance in the measuring, a correction process on the distance for each of the rows or each of the columns according to a movement range of the in-focus position in which the in-focus position is moved during the exposure for the each of the rows or the each of the columns when the plurality of blurred images are obtained Although distance measurement apparatuses according to one or more aspects are described based on the embodiments, the present invention is not limited to such embodiments. Various modifications to the present embodiments that can be conceived by those skilled in the art, and forms configured by combining constituent elements in different embodiments without departing from the teachings of the present invention may be included in the scope of one or more of the aspects.

INDUSTRIAL APPLICABILITY

The present invention is applicable to a distance measurement apparatus that measures a distance to an object using a captured image and an automatic focus apparatus that is to be used in a camera, a video camera, or the like, and is capable of distance measurement and automatic focusing with a high frame rate and reduced power consumption.

REFERENCE SIGNS LIST 10, 20 Distance measurement apparatus
11 Optical system
12, 22 In-focus position setting unit
12A, 22A Imaging control unit
13, 23 In-focus position control unit
14 Imaging element
15, 25 Image obtainment unit
16 Distance measurement unit
17, 27 Distance correction unit
17, 27A Correction unit
18, 28 Distance correction amount calculation unit

The invention claimed is:

1. A distance measurement apparatus comprising:
an imaging element that includes photoelectric conversion elements arranged in rows and columns, and images an object by performing exposure and readout of electric charges sequentially for each of the rows or each of the columns;
an optical system that is for forming an image of the object on the imaging element and has an in-focus position that is controllable;
control circuitry; and
a storage device, the control circuitry being operative to:
(i) control the optical system to cause the in-focus position to move at constant speed and (ii) cause the imaging element to image the object sequentially while the in-focus position is being moved at the constant speed, to obtain a plurality of blurred images;
measure a distance from a reference position in the optical system to the object using the plurality of blurred images and a point spread function dependent on object distance; and
perform, before or after the measurement of the distance, a correction process on the distance for each of the rows or each of the columns according to a movement range of the in-focus position in which the in-focus position is moved during the exposure for the each of the rows or the each of the columns when the plurality of blurred images are obtained.

2. The distance measurement apparatus according to claim 1,
wherein the control circuitry is operative:
obtain, as the plurality of blurred images, at least (n+1) blurred images where n is an integer greater than or equal to 1;
when a point in time for starting exposure of the imaging element to obtain a first image which is one of the at least (n+1) blurred images that is obtained first is denoted by TS(1), a point in time for ending the exposure of the imaging element to obtain the first image is denoted by TE(1), a point in time for starting exposure of the imaging element to obtain a second image which is one of the at least (n+1) blurred images that is obtained last is denoted by TS(1+n), and a point in time for ending the exposure of the imaging element to obtain the second image is denoted by TE(1+n),
(i) cause the in-focus position to be at a first position at TS(1);
(ii) cause the in-focus position to be at a second position at TE(1+n), the second position being different from the first position;
(iii) cause the in-focus position to move at the constant speed in a period from TS(1) to TE(1) and in a period from TS(1+n) to TE(1+n);
measure the distance from the reference position to the object for each pixel in at least one of the first image or the second image using the point spread function, the first image, and the second image; and
perform the correction process according to a movement range of the in-focus position in which the in-focus position is moved during the exposure for the each of the rows or the each of the columns when the first image and the second image are obtained.

3. The distance measurement apparatus according to claim 2,
wherein the control circuitry is operative to cause the in-focus position to move, in the period from TS(1+n) to TE(1+n), at a speed equal to a speed at which the in-focus position moves in the period from TS(1) to TE(1).

4. The distance measurement apparatus according to claim 3,
wherein the control circuitry is operative to, before the obtainment of the plurality of blurred images, determine whether or not a condition that the point in time for starting the exposure of the imaging element to obtain the second image is earlier than the point in time for ending the exposure of the imaging element to obtain the first image is satisfied, and
upon determining that the condition is satisfied (i) perform a process to obtain the plurality of blurred images, (ii) perform a process to measure the distance, and (iii) perform the correction process.

5. The distance measurement apparatus according to claim 4,
wherein the control circuitry is operative to obtain, as the plurality of blurred images, at least (n+1) blurred images where n is an integer greater than or equal to 1, and
when a point in time for starting exposure of the imaging element to obtain a (1+x)-th image which is one of the plurality of blurred images is denoted by TS(1+x), a point in time for ending the exposure of the imaging element to obtain the (1+x)-th image is denoted by TE(1+x), a point in time for starting exposure of the imaging element to obtain a (1+x+1)-th image which is one of the plurality of blurred images is denoted by TS(1+x+1), and a point in time for ending the exposure of the imaging element to obtain the (1+x+1)-th image is denoted by TE(1+x+1) where (n−1)≥x≥0,
the control circuitry is operative to determine a sequence of points in time TE(1+x) and TS(1+x+1), and
cause the in-focus position to move at the constant speed from a third position to a fourth position in a period from TS(1+x) to TE(1+x+1) upon determining that TE(1+x)>TS(1+x+1) holds, the fourth position being different from the third position.

6. The distance measurement apparatus according to claim 5,
wherein upon determining that TE(1+x)<TS(1+x+1) holds,
the control circuitry is operative to:
(i) cause the in-focus position to stop at the third position in a period from TS(1+x) to TE(1+x);
(ii) cause the in-focus position to move from the third position to the fourth position in a period from TE(1+x) to TS(1+x+1); and
(iii) cause the in-focus position to stop at the fourth position in a period from TS(1+x+1) to TE(1+x+1).

7. The distance measurement apparatus according to claim 2,
wherein n is 1.

8. The distance measurement apparatus according to claim 2,
wherein n is an integer greater than or equal to 2, and
the control circuitry is operative to measure the distance using three or more blurred images as the plurality of blurred images.

9. The distance measurement apparatus according to claim 1,
wherein the control circuitry is operative to calculate, for each of the rows or each of the columns in the imaging element, an amount of correction for the distance measured, and
the control circuitry is operative to calculate the amount of correction for each of the rows or each of the columns in the imaging element, to approximate (i) a diameter of the point spread function corresponding to the movement range of the in-focus position in which the in-focus position is moved during the exposure for the each of the rows or the each of the columns in the imaging element and (ii) a diameter of a point spread function corresponding to a range of an in-focus position of light that has traveled a predetermined distance.

10. The distance measurement apparatus according to claim 9,
wherein the control circuitry is operative to, after the measurement of the distance, perform the correction process by adding or subtracting the amount of correction calculated for each of the rows or each of the columns in the imaging element to or from the distance measured.

11. The distance measurement apparatus according to claim 9,
wherein the control circuitry is operative to, before the measurement of the distance, perform the correction process by changing the point spread function that is to be used to calculate the distance, according to the amount of correction calculated for each of the rows or each of the columns in the imaging element, and
the control circuitry is operative to measure the distance using the point spread function that is obtained after the correction process is performed.

12. The distance measurement apparatus according to claim 1,
wherein the control circuitry is operative to cause a part of the imaging element including photoelectric conversion elements arranged in rows and columns to image the object, to obtain a plurality of blurred images that correspond to a part of the object, the part of the imaging element being used as the imaging element, and the part of the object corresponding to the part of the imaging element, and
the control circuitry is operative to measure the distance for the part of the object.

13. A distance measurement method which is used by a distance measurement apparatus including:
an imaging element that includes photoelectric conversion elements arranged in rows and columns, and images an object by performing exposure and readout of electric charges sequentially for each of the rows or each of the columns; and
an optical system that is for forming an image of the object on the imaging element and has an in-focus position that is controllable,
the distance measurement method comprising:
(i) controlling the optical system to cause the in-focus position to move at constant speed and (ii) causing the imaging element to image the object sequentially while the in-focus position is being moved at the constant speed, to obtain a plurality of blurred images;
measuring a distance from a reference position in the optical system to the object using the plurality of blurred images and a point spread function dependent on object distance; and
performing, before or after the measurement of the distance in the measuring, a correction process on the distance for each of the rows or each of the columns according to a movement range of the in-focus position in which the in-focus position is moved during the exposure for the each of the rows or the each of the columns when the plurality of blurred images are obtained.

14. A non-transitory computer-readable recording medium having recorded thereon a program for causing a computer to execute the distance measurement method according to claim 13.

* * * * *